(12) United States Patent
Rhee et al.

(10) Patent No.: US 9,710,099 B2
(45) Date of Patent: Jul. 18, 2017

(54) MOBILE TERMINAL AND METHOD FOR CONTROLLING THE SAME

(71) Applicant: LG ELECTRONICS INC., Seoul (KR)

(72) Inventors: Jeongyoon Rhee, Seoul (KR); Taeseong Kim, Seoul (KR); Yujune Jang, Seoul (KR); Taekyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 50 days.

(21) Appl. No.: 14/822,946

(22) Filed: Aug. 11, 2015

(65) Prior Publication Data

US 2016/0041684 A1  Feb. 11, 2016

(30) Foreign Application Priority Data

Aug. 11, 2014 (KR) .................. 10-2014-0103263

(51) Int. Cl.
   *G06F 3/041*   (2006.01)
   *H04N 5/232*   (2006.01)
   *G06F 3/0488*  (2013.01)

(52) U.S. Cl.
   CPC .......... *G06F 3/0416* (2013.01); *G06F 3/0488* (2013.01); *H04N 5/23212* (2013.01); *H04N 5/23216* (2013.01); *H04N 5/23296* (2013.01); *G06F 2203/04102* (2013.01); *G06F 2203/04104* (2013.01); *G06F 2203/04808* (2013.01)

(58) Field of Classification Search
   CPC ................ G06F 3/0416; G06F 3/0488; G06F 2203/04104; G06F 2203/04808
   See application file for complete search history.

(56) References Cited

U.S. PATENT DOCUMENTS

| | | | |
|---|---|---|---|
| 2015/0002406 A1* | 1/2015 | Small ................... | G06F 3/041 345/173 |
| 2015/0205426 A1* | 7/2015 | Conzola ............. | G06F 3/04883 345/173 |
| 2015/0261280 A1* | 9/2015 | Hsiao .................... | G06F 3/0416 345/173 |
| 2015/0346895 A1* | 12/2015 | Bokma ................ | G06F 3/0416 345/173 |

* cited by examiner

*Primary Examiner* — Dennis Joseph
(74) *Attorney, Agent, or Firm* — Ked & Associates, LLP

(57) ABSTRACT

A mobile terminal and a method of controlling the same are disclosed. The mobile terminal may include a touch screen and a controller configured to control output on the touch screen based on touch inputs detected while the touch screen is in an inactive state. A first touch input may be detected at a point on the touch screen while the touch screen is inactive and a second touch input may be detected on the inactive touch screen while the first touch input is maintained on the touch screen. An entire area or a partial area of the touch screen is activated according to the detected second touch input while the first touch input is maintained on the touch screen. Moreover, an execution screen of a prescribed application may be output on the activated area of the touch screen while the first touch input is maintained on the touch screen.

18 Claims, 30 Drawing Sheets

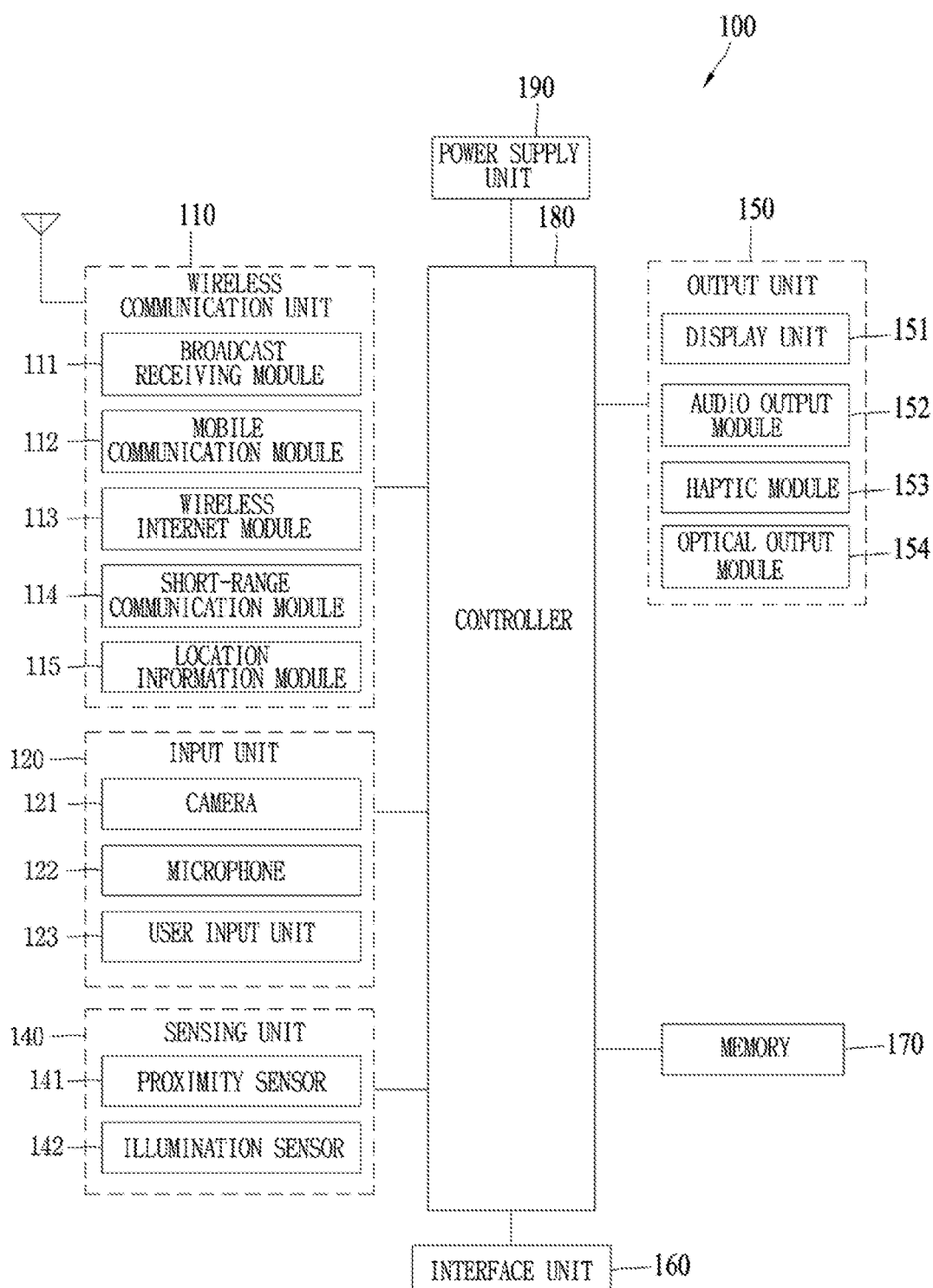

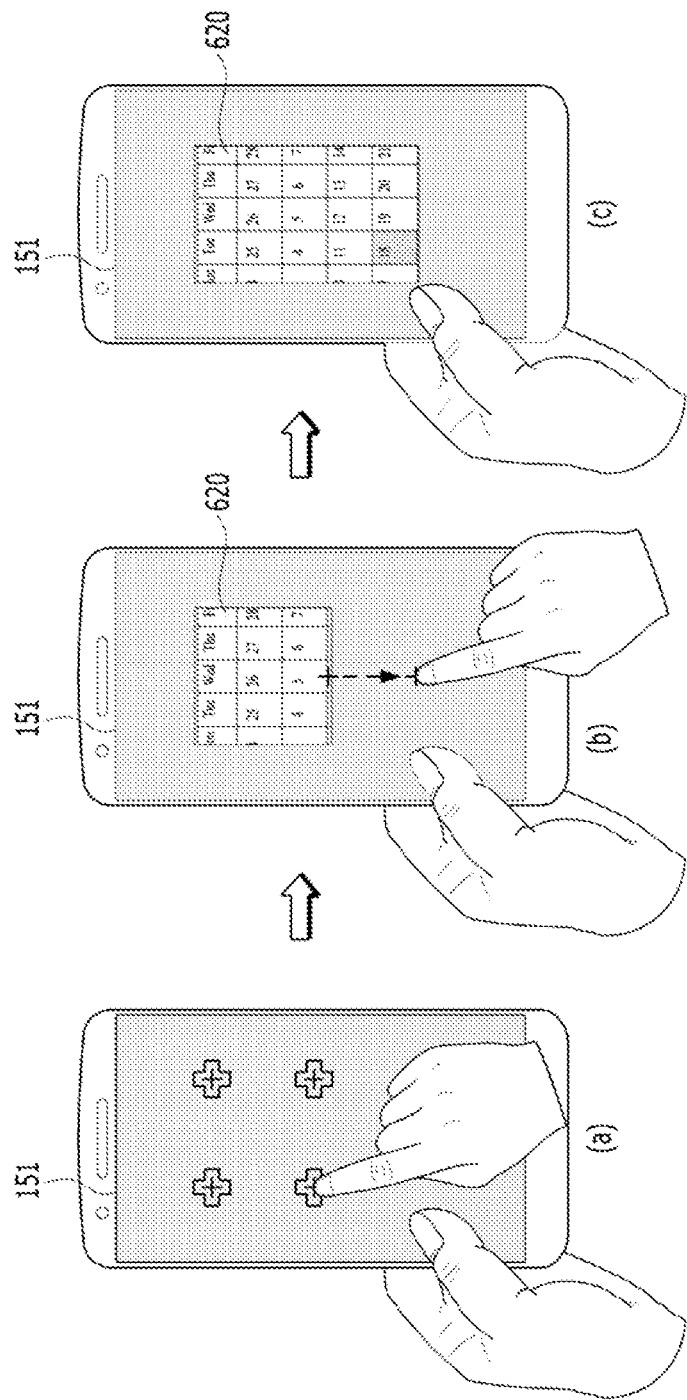

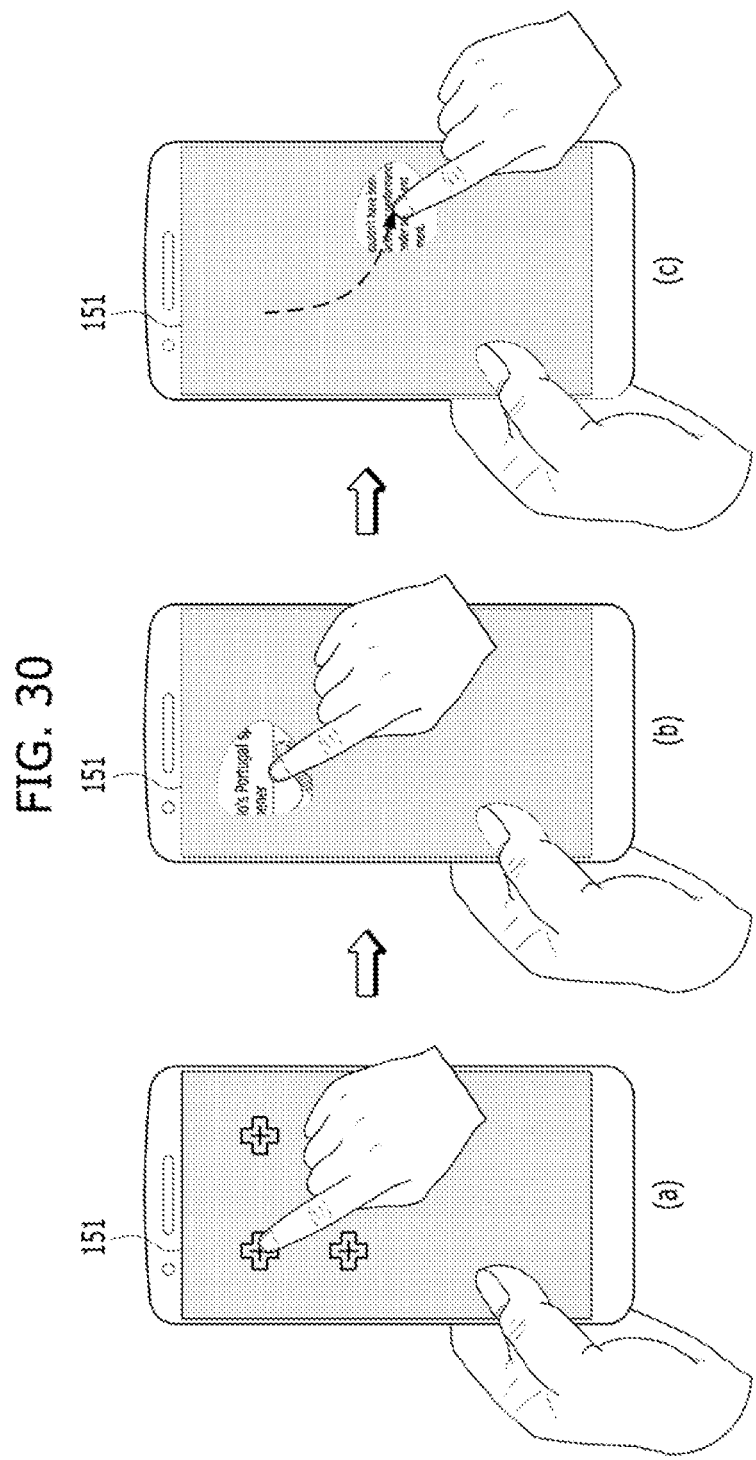

MOBILE TERMINAL AND METHOD FOR CONTROLLING THE SAME

CROSS-REFERENCE TO RELATED APPLICATION(S)

This application claims priority under 35 U.S.C. §119 to Korean Patent Application No. 10-2014-0103263 filed on Aug. 11, 2014 in Korea, whose entire disclosure is hereby incorporated by reference.

BACKGROUND

1. Field

The present disclosure relates to a mobile terminal enabling a user to more conveniently use the terminal and a method of controlling therefor.

2. Background

Mobile terminals and methods of controlling the same are known. However, they suffer from various disadvantages.

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In case of using each function of a mobile terminal or an application installed in the mobile terminal, a user should select an application corresponding to the each function, a menu or the like one by one after a lock screen set to the mobile terminal is unlocked. Hence, it is desirable to provide a more convenient access to frequently used applications or specific functions which require quick access.

BRIEF DESCRIPTION OF THE DRAWINGS

The embodiments will be described in detail with reference to the following drawings in which like reference numerals refer to like elements wherein:

FIG. 1A is a block diagram of a mobile terminal in accordance with the present disclosure;

FIG. 29 is a diagram illustrating a further different example of a screen output on a display unit of a mobile terminal according to one embodiment of the present disclosure; and FIG. 30 is a diagram illustrating a further different example of a screen output on a display unit of a mobile terminal according to one embodiment of the present disclosure.

DETAILED DESCRIPTION

Figure 1B:
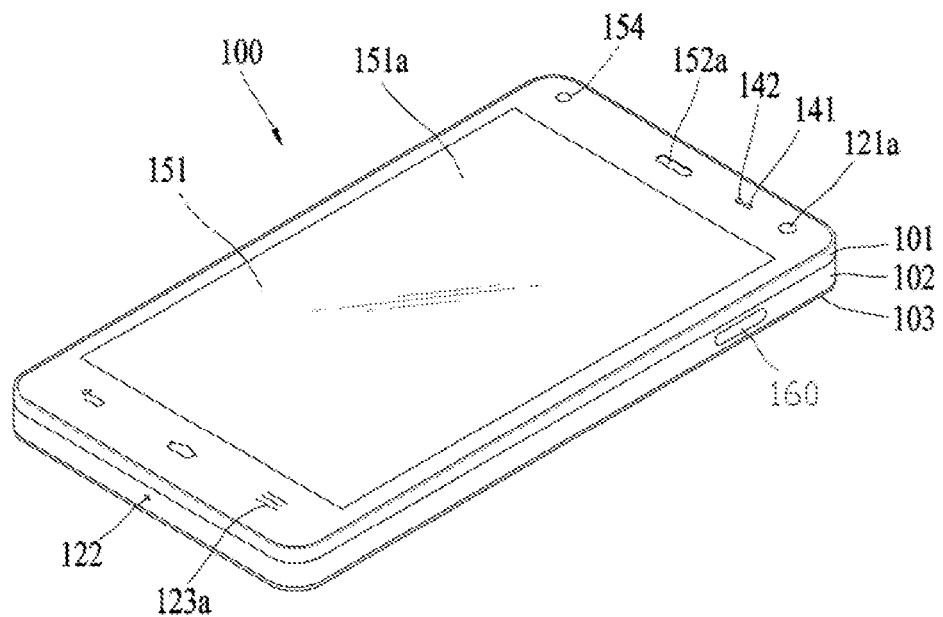
FIGS. 1B and 1C are conceptual views of one example of the mobile terminal, viewed from different directions.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

An object of the present disclosure is to address the above-noted and other disadvantages of the prior art.

Another object of the present disclosure is to provide a mobile terminal configured to provide a user environment enabling a user to more easily access a predetermined specific application or a specific function and a method of controlling therefor when the user intends to use the application or the specific function in a state in which a display unit is inactive or locked.

Technical tasks obtainable from the present disclosure are non-limited the above-mentioned technical task. And, other unmentioned technical tasks can be clearly understood from the following description by those having ordinary skill in the technical field to which the present disclosure pertains.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, according to one embodiment, the mobile terminal may include a touch screen and a controller. The controller may be configured to detect a first touch input touching a random point of the touch screen in a state in which the touch screen is inactivated, to detect a second touch input touching the inactivated touch screen in a state in which the first touch input is maintained, to activate a whole area or a partial area of the touch screen according to the detected second touch input in the state that the first touch input is maintained, to output an execution screen of a specific application on the activated area of the touch screen in the state that the first touch input is maintained.

To further achieve these objects and other advantages and in accordance with the purpose of the disclosure, as embodied and broadly described herein, according to a different embodiment, a method of controlling a mobile terminal may include the steps of detecting a first touch input touching a point of an inactivated touch screen, detecting a second touch input touching the inactivated touch screen in a state in which the first touch input is maintained, activate a first area of the touch screen according to the detected second touch input in the state in which the first touch input is maintained, and outputting a predetermined first screen on the activated first area in the state in which the first touch input is maintained.

It is to be understood that both the foregoing general description and the following detailed description of the present disclosure are exemplary and explanatory and are intended to provide further explanation of the disclosure as claimed.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

Figure 1C:
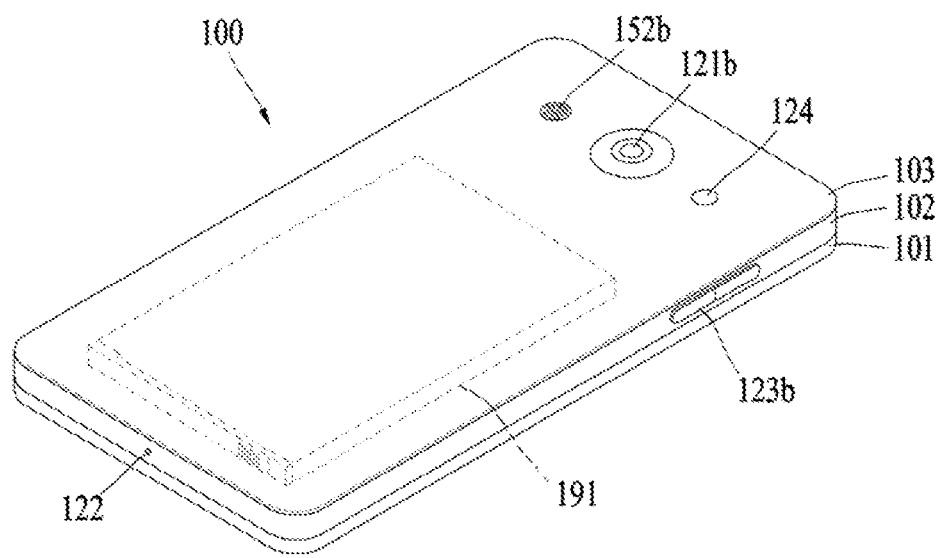

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 may include one or more of a broadcast receiving module 111, a mobile communication module 112, a wireless Internet module 113, a short-range communication module 114, and a location information module 115.

The input unit 120 may include a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) may be obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

System which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may receive external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
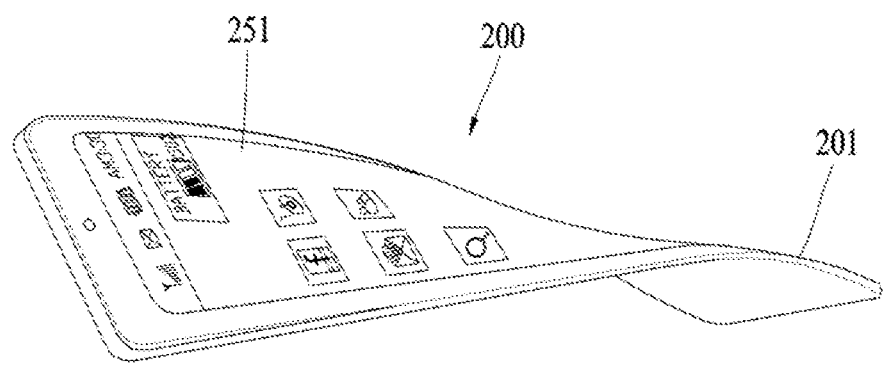
FIG. 2 is a conceptual view of a deformable mobile terminal according to one embodiment of the present disclosure.

FIG. 2 is a conceptual view of a deformable mobile terminal according to an alternative embodiment of the present disclosure. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state in which the flexible display unit 251 is not deformed (for example, in a state with an infinite radius of curvature and referred to as a first state), a display region of the flexible display unit 251 includes a generally flat surface. When in a state in which the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251.

A battery (not shown in this figure) located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
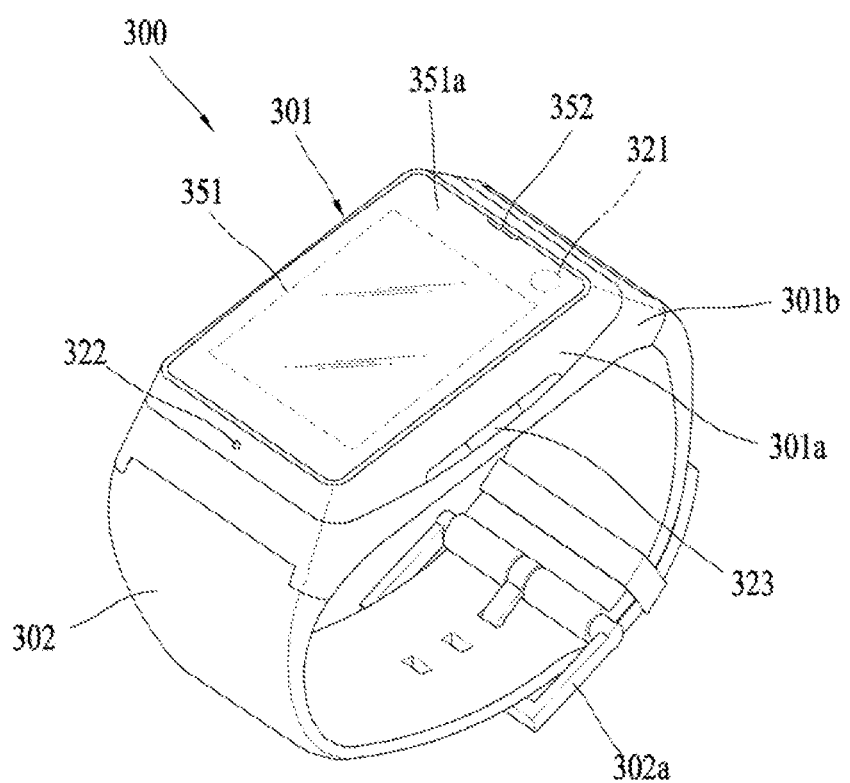
FIG. 3 is a conceptual view of a wearable mobile terminal according to one embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301*a* and a second case 301*b* cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351*a* is positioned on the first case 301*a* to form a front surface of the terminal body together with the first case 301*a*.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion (not shown) electrically connected to the antenna to extend a ground area.

The band 302 may include fastener 302*a*. The fastener 302*a* may be implemented into a buckle type, a snap-fit hook structure, a Velcro® type, or the like, and include a flexible section or material. The drawing illustrates an example that the fastener 302*a* is implemented using a buckle.

Figure 4:
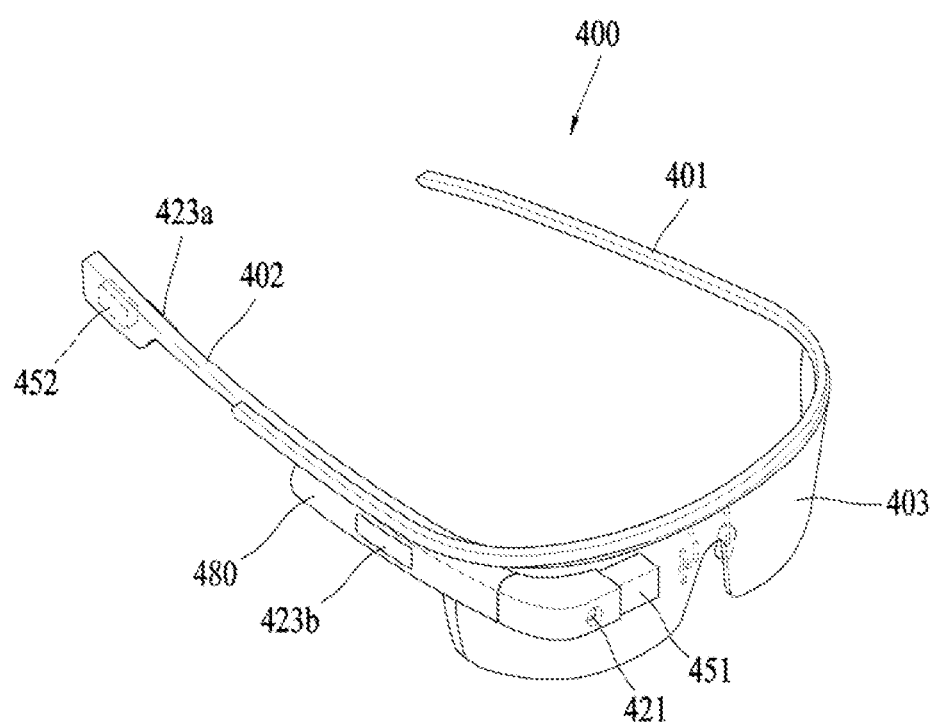
FIG. 4 is a conceptual view of a wearable mobile terminal according to another embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user.

In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423*a* and 423*b*, which can each be manipulated by the user to provide an input. The user input units 423*a* and 423*b* may employ techniques which permit input via a tactile input. Typical tactile inputs include a touch, push, or the like. The user input units 423*a* and 423*b* are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Embodiments of the present disclosure explain a mobile terminal 100 shown in FIG. 1A to FIG. 1C for example. Yet, depending on an embodiment, a mobile terminal of the embodiments of the present disclosure may correspond to one of a mobile terminal 200 shown in FIG. 2, a mobile terminal 300 shown in FIG. 3, and a mobile terminal 400 shown in FIG. 4.

Figure 5:
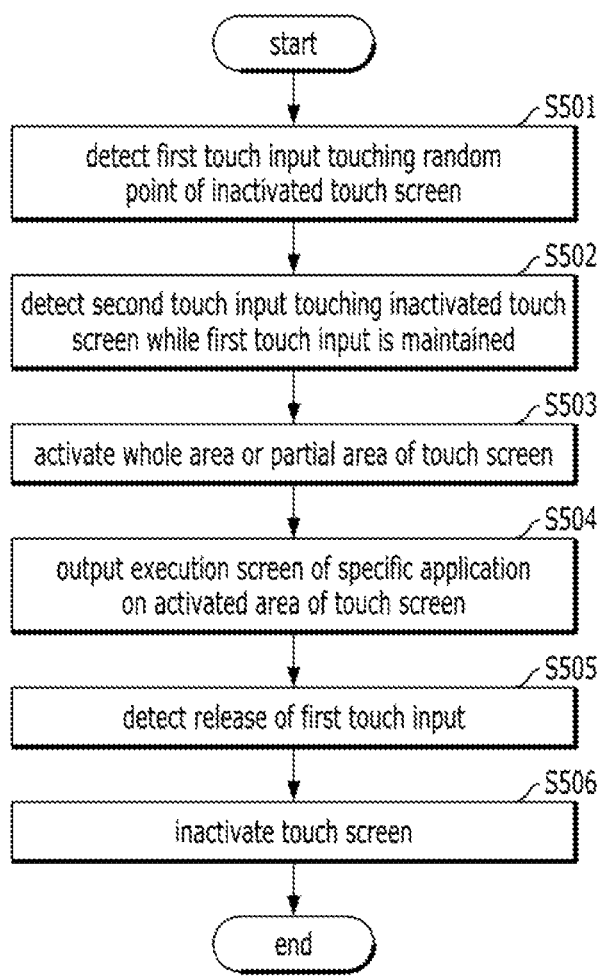
FIG. 5 is a flowchart of a method of accessing a specific application in a mobile terminal according to one embodiment of the present disclosure in a state in which a display unit is inactivated.

FIG. 5 is a flowchart of a method of accessing a specific application in a mobile terminal in a state in which a display unit is inactivated according to one embodiment of the present disclosure.

A controller 180 of a mobile terminal 100 detects a first touch input touching a random point of an inactivated touch screen 151 [S501]. The random point may be any point on the touch screen 151 which is inactive. Inactive may refer to the display or region of the display which is turned off, deactivated, or the like. When a user holds the mobile terminal 100, the user can naturally touch the touch screen 151 using a finger (e.g., a thumb). Hence, the user can take a posture of normally holding the mobile terminal 100. In one embodiment, the user should maintain constant contact on the touch screen 151 with the finger as long as a specific function or a specific application is being used.

Depending on the embodiment, a screen lock may be set to the touch screen 151 or may be not set to the touch screen. In this case, the screen lock means to secure or lock the touch screen to make general functions of the mobile terminal 100 unavailable unless a user inputs a predetermined password or code via the touch screen 151.

The controller 180 then detects a second touch input touching the inactivated touch screen 151 in a state in which the first touch input is maintained [S502]. The first touch input may be maintained on the touch screen in a manner in which the first touch input is continuously detected at the random point where the first touch input is first detected or is continuously detected on the touch screen 151 as the first touch input moves on the touch screen 151.

The second touch input may include at least one of a touch input touching a point of the inactivated touch screen 151, a touch input touching a point of the inactivated touch screen 151 and dragging (e.g., including a straight line dragging or a curve line dragging) in a random direction, a touch input touching a point of the inactivated touch screen 151 and flicking in a random direction, or a touch input touching a plurality of points of the inactivated touch screen 151 in a predetermined order.

The controller 180 may activate a whole area or a partial area of the touch screen 151 according to the detected second touch input [S503].

Subsequently, the controller 180 outputs an execution screen of a specific application on the activated area of the touch screen 151 [S504]. If the second touch input is detected, the controller 180 executes the predetermined specific application and controls the touch screen 151 to output an execution screen of the specific application on the activated area.

Depending on the embodiment, the controller 180 can execute a different application according to a type of the second touch input. For instance, if the detected second touch input corresponds to a touch input touching a point on the inactivated touch screen 151, the controller can execute a first application in response to the touch input. If the detected second touch input corresponds to a touch input touching a point of the inactivated touch screen 151 and dragging in a random direction, the controller can execute a second application in response to the touch input. A memory 170 may be able to store in advance a type of the second touch input, which is detected in a state in which the first touch input is maintained, and a mapping data to a particular corresponding application.

If a whole area of the touch screen 151 is activated in the step S503, the execution screen of the specific application can be outputted on the activated whole area. If a partial area of the touch screen 151 is activated in the step S503, the execution screen of the specific application can be outputted on the activated partial area.

Depending on the embodiment, when a screen lock is set to the touch screen 151, if the second touch input is detected, the controller 180 can activate the whole area or the partial area of the touch screen 151 only to enable a user to use the predetermined specific application while the screen lock of the touch screen 151 is not unlocked.

Meanwhile, if release of the first touch input is detected [S505], the controller 180 may make the touch screen 151 inactive [S506]. If the release of the first touch input is detected at any time of performing the step S503 or the step S504 or after the step S504, the controller 180 can inactivate the touch screen 151. And, if the release of the first touch input is detected, the controller 180 can terminate the specific application.

In the following, examples of the aforementioned method mentioned earlier in FIG. 5 are explained in more detail with reference to FIG. 6 to FIG. 17.

Figure 6:
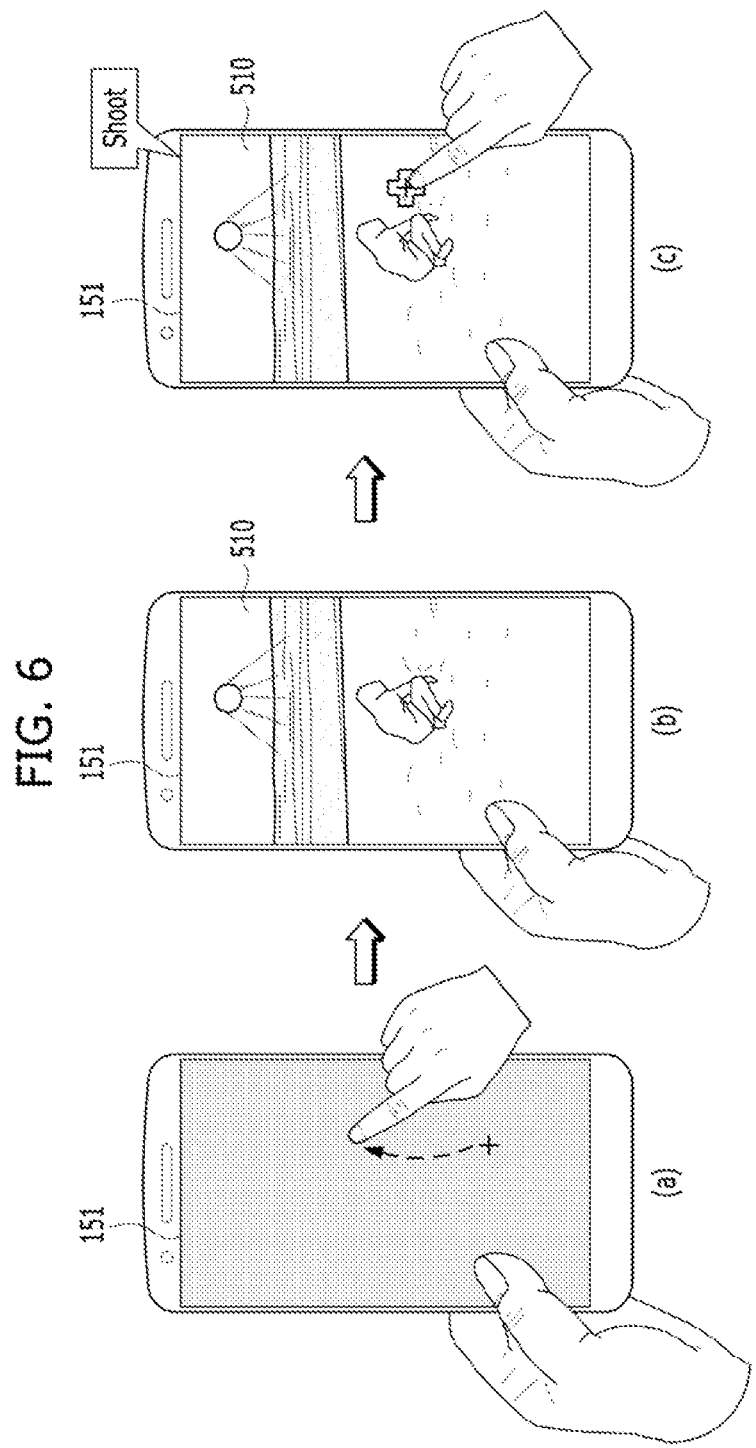
FIG. 6 is a diagram illustrating an example of a screen output on a display unit of a mobile terminal according to one embodiment of the present disclosure.

FIG. 6 is a diagram illustrating an example of a screen outputted on a display unit of a mobile terminal according to one embodiment of the present disclosure.

Referring to FIG. 6(a), a controller 180 of a mobile terminal 100 detects a first touch input touching a random point of an inactivated touch screen 151. As an example, assume that the first touch input corresponds to a touch input touching a point of the touch screen 151 with a thumb while a user is holding the mobile terminal 100 with a left hand. Of course, the user may hold the mobile terminal 100 with a right hand depending on the embodiment. In this case, it is apparent that embodiments of the present disclosure can be identically applied.

Subsequently, the controller 180 detects a second touch input touching the inactivated touch screen 151 in a state in which the first touch input is maintained. As an example, assume that the second touch input corresponds to a touch input touching a point of the inactivated touch screen 151 with an index finger of the right hand and dragging the touch in an up direction.

The controller 180 may activate a whole area or a partial area of the touch screen 151 according to the detected second touch input and outputs an execution screen of a specific application on the activated area of the touch screen 151.

As an example, referring to FIG. 6(b), the controller 180 may activate the whole area of the touch screen 151, execute a camera application and can output an execution screen 510 of the camera application on the activated area of the touch screen 151. The execution screen 510 may include a preview image captured by a camera 121.

When the execution screen 510 is outputted on the touch screen 151, the controller 180 can detect a third touch input touching the activated area of the touch screen 151 or the inactivated area of the touch screen 151.

As an example, referring to FIG. 6(c), when the execution screen 510 is outputted on the touch screen 151, the controller 180 may detect a third touch input touching the activated area of the touch screen 151 in a state in which the first touch input is maintained. The third touch input may correspond to a touch input touching a point in the activated area of the touch screen 151 one-time or a touch input touching the point for predetermined time.

The controller 180 can execute a specific function related to the specific application according to the detected third touch input. In the present embodiment, the controller 180 can execute a picture capturing function as a specific function related to a camera application according to the detected third touch input. Hence, if the third touch input is detected, the controller 180 can control the camera 121 to capture a preview image included in the execution screen 510.

Although it is not depicted, if release of the first touch input is detected at any time, the controller 180 can inactivate the touch screen 151.

Figure 7:
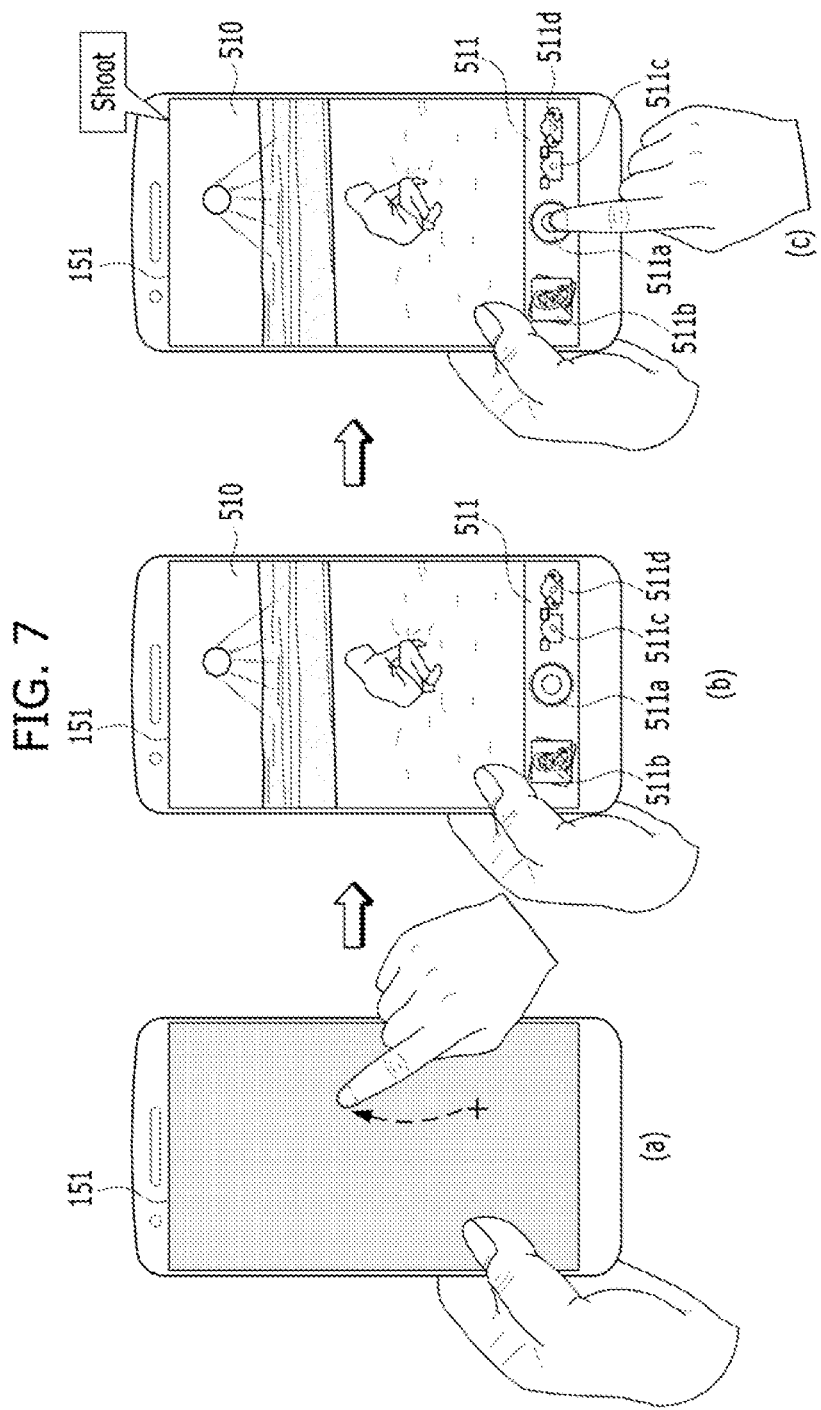
FIG. 7 is a diagram illustrating another example of a screen output on a display unit of a mobile terminal according to one embodiment of the present disclosure.

FIG. 7 is a diagram illustrating a different example of a screen outputted on a display unit of a mobile terminal according to one embodiment of the present disclosure. Contents overlapped with what is mentioned earlier in FIG. 6 are omitted at this time. Following description mainly concerns difference.

Referring to FIGS. 7(a) and (b), if a second touch input touching an inactivated touch screen 151 is detected in a state in which a first touch input is maintained, a controller 180 of a mobile terminal 100 can output an execution screen 510 of a camera application on an activated area of the touch screen 151. The execution screen 510 may include a preview image captured by a camera 121.

The execution screen 510 can include a preview image captured by the camera 121 and GUI 511 corresponding to functions related to the camera application. As an example, the GUI 511 may include a first icon 511a corresponding to a picture capturing function, a second icon 511b corresponding to a picture preview function, a third icon 511c corresponding to a picture/video capturing switching function, and a fourth icon 511d corresponding to a front/rear camera switching function. Besides, the GUI 511 may additionally include an icon corresponding to a zoom-in/zoom-out function, an icon corresponding to setting, and the like.

Referring to FIG. 7(c), if a third touch input selecting an icon corresponding to a specific function from the GUI 511 is detected, the controller 180 can execute a function selected by the third touch input. As an example, if the third touch input selecting the first icon 511a from the GUI 511 is detected, the controller 180 can execute the picture capturing function selected by the third touch input. Hence, the controller 180 can control the camera 121 to capture a preview image included in the execution screen 510.

Figure 8:
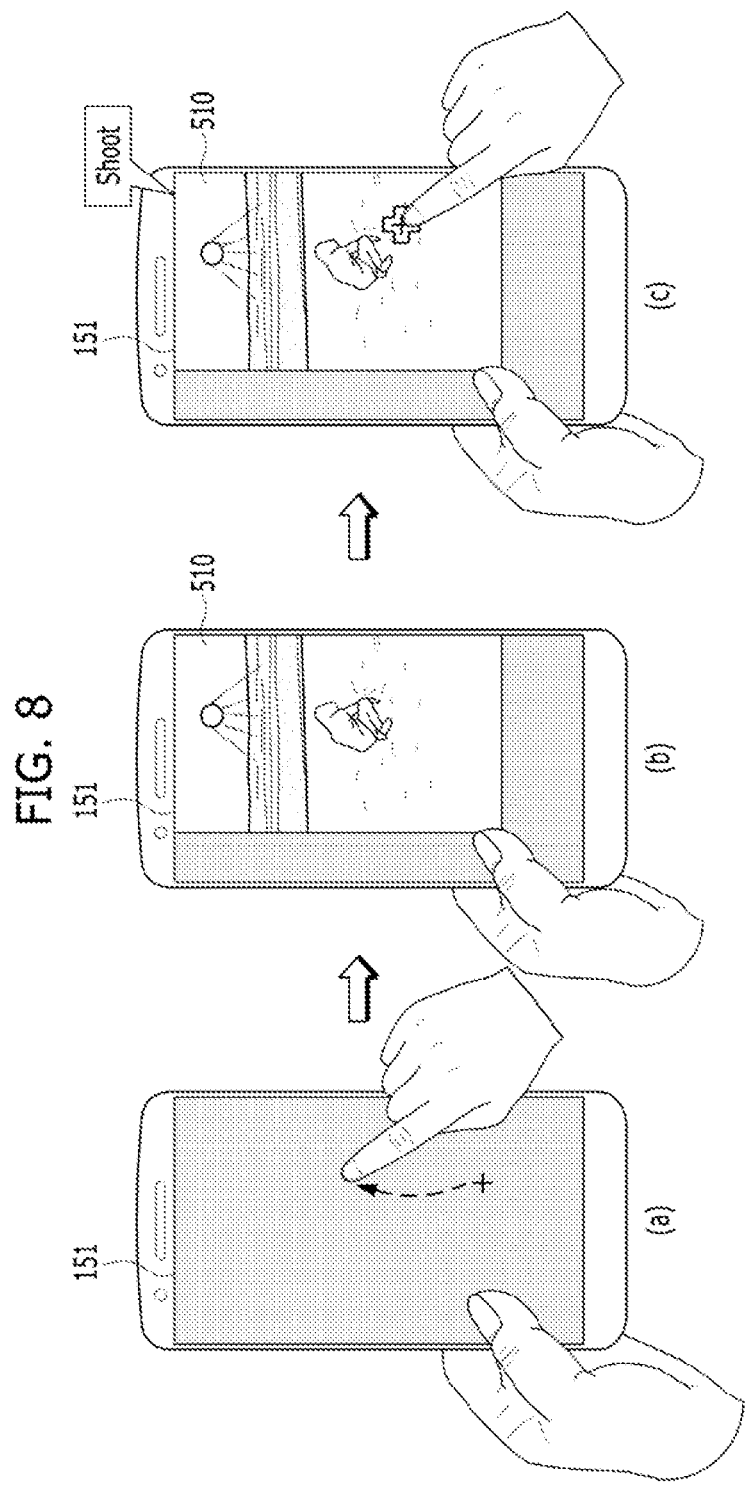
FIG. 8 is a diagram illustrating a further different example of a screen output on a display unit of a mobile terminal according to one embodiment of the present disclosure.

FIG. 8 is a diagram illustrating a further different example of a screen outputted on a display unit of a mobile terminal according to one embodiment of the present disclosure. Contents overlapped with what is mentioned earlier in FIG. 6 are omitted at this time. Following description mainly concerns difference.

Referring to FIGS. 8(a) and (b), if a second touch input touching an inactivated touch screen 151 is detected in a state in which a first touch input is maintained, a controller 180 of a mobile terminal 100 may activate a partial area of the touch screen 151 and may output an execution screen 510 of a camera application on the activated area of the touch screen 151. The execution screen 510 may include a preview image captured by a camera 121.

In the present embodiment, if the second touch input is detected, the controller 180 can activate a partial area of the touch screen 151 based on a point of the touch screen 151 on which the first touch input is detected. For instance, when the second touch input is detected, if a specific point of the touch screen 151 on which the first touch input is detected is located above a center of the touch screen 151, the activated area may correspond to an area located below the specific point. If the specific point is located below the center of the touch screen 151, the activated area may correspond to an area located above the specific point. Depending on the embodiment, the activated area of the touch screen 151 may include the specific point. Also, the specific point may be positioned at the edge of the activated area of the touch screen 151. When a user is holding the mobile terminal 100 with a left hand, if a left thumb of the user blocks the activated area of the touch screen 151, it may be inconvenient for the user. Hence, in case of determining a partial area in which the touch screen 151 is activated, it may consider a point at which the left thumb is positioned on the touch screen 151.

Although it is not depicted, the GUI 511 mentioned earlier in FIG. 7 may be included in the execution screen 510 depending on the embodiment.

Figure 9:
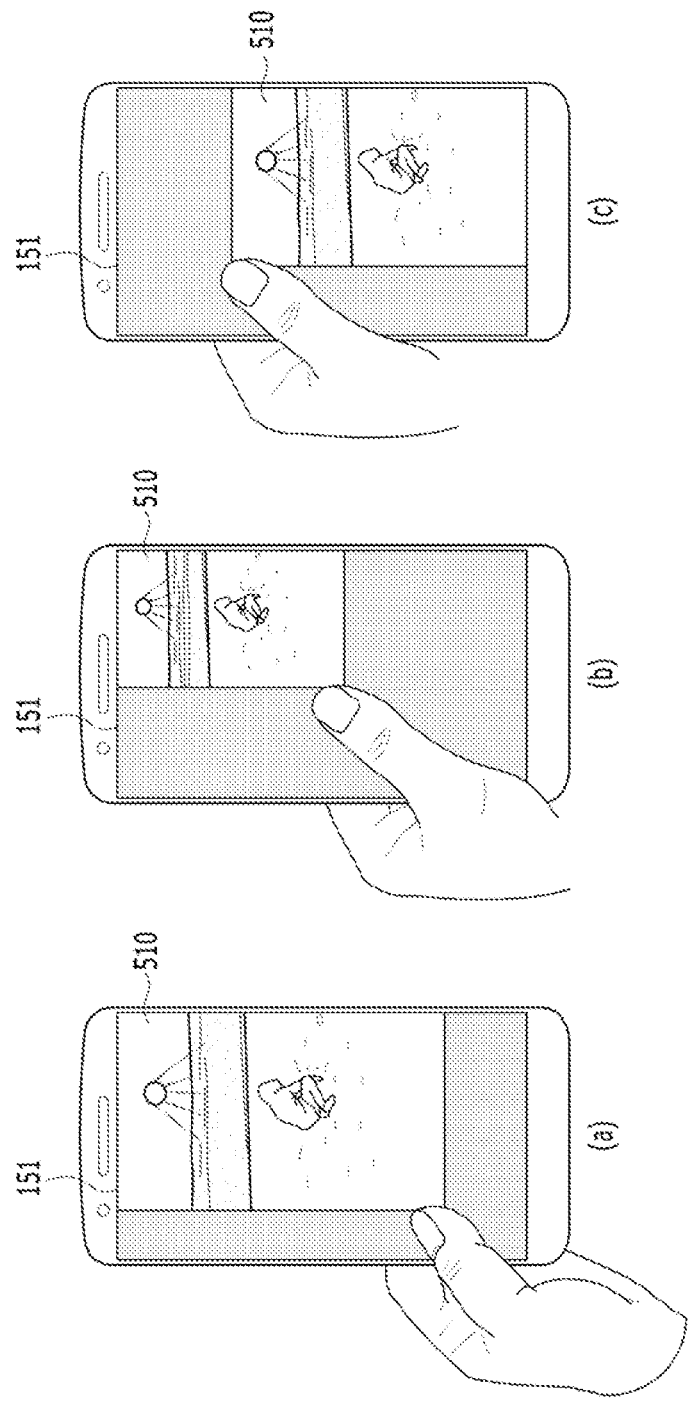
FIG. 9 is a diagram illustrating a further different example of a screen output on a display unit of a mobile terminal according to one embodiment of the present disclosure.

FIG. 9 is a diagram illustrating a further different example of a screen outputted on a display unit of a mobile terminal according to one embodiment of the present disclosure. Contents overlapped with what is mentioned earlier in FIG. 6 to FIG. 8 are omitted at this time. Following description mainly concerns difference.

The present embodiment assumes that a partial area of a touch screen 151 is activated according to a second touch input which is detected while a first touch input is maintained and an execution screen 510 of a camera application is outputted on the activated area of the touch screen 151. And, the execution screen 510 includes a preview image captured by a camera 121.

For instance, a user can change a position of a left hand holding a mobile terminal 100. In doing so, a specific point of the touch screen 151 on which the first touch input is detected may change. If movement of the specific point of the first touch input is detected on the touch screen 151, the controller 180 can change at least one of a position or a size of the activated area of the touch screen 151. If a screen ratio (e.g., 4:3, 16:9 and the like) of an image is predetermined in relation to a camera application, it may be able to determine a size of the activated area of the touch screen 151 based on the predetermined screen ratio depending on the embodiment.

In the present embodiment, the execution screen 510 outputted on the activated area of the touch screen 151 can include a whole preview image captured by the camera 121 although the position and/or the size of the activated area of the touch screen 151 is changed.

Figure 10:
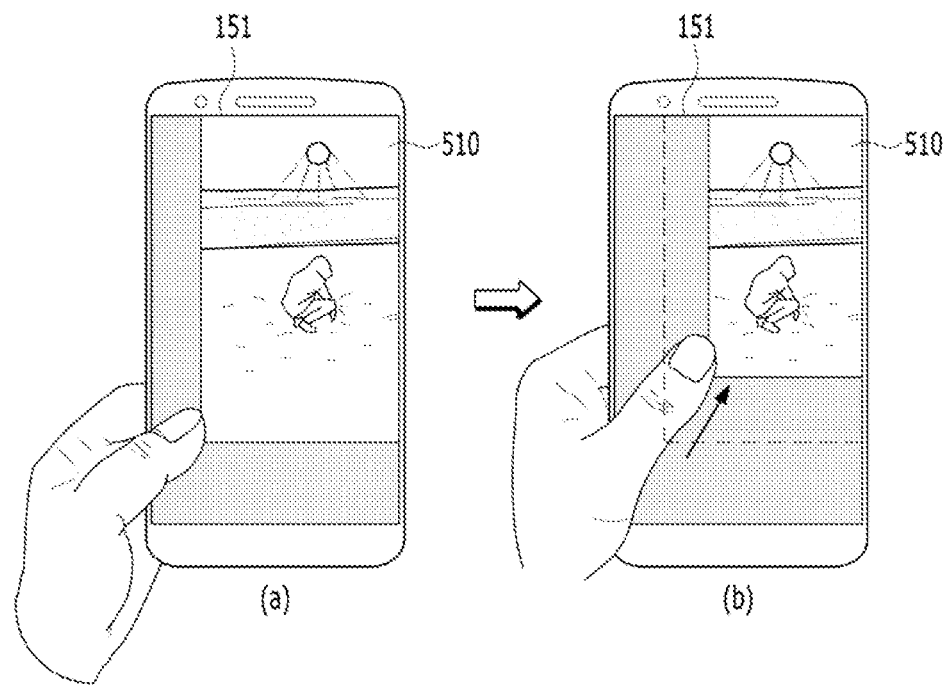
FIG. 10 is a diagram illustrating a further different example of a screen output on a display unit of a mobile terminal according to one embodiment of the present disclosure.

FIG. 10 is a diagram illustrating a further different example of a screen outputted on a display unit of a mobile terminal according to one embodiment of the present disclosure. Contents overlapped with what is mentioned earlier in FIG. 9 are omitted at this time. Following description mainly concerns difference.

The present embodiment assumes that a partial area of a touch screen 151 is activated according to a second touch input which is detected while a first touch input is maintained and an execution screen 510 of a camera application is outputted on the activated area of the touch screen 151. And, the execution screen 510 includes a preview image captured by a camera 121 in this non-limiting example.

For instance, a user can change a position of a left hand holding a mobile terminal 100. In doing so, a specific point of the touch screen 151 on which the first touch input is detected may change. If movement of the specific point on which the first touch input is detected is detected on the touch screen 151, the controller 180 can change at least one of a position or a size of the activated area of the touch screen 151.

In the present embodiment, if the position and/or the size of the activated area of the touch screen 151 changes, the execution screen 510 outputted on the activated area of the touch screen 151 may include a whole preview image captured by the camera 121 or a part of the preview image captured by the camera 121 only. In this case, although the position and/or the size of the activated area of the touch screen 151 is changed, the preview image included in the execution screen 510 can be fixed in magnification.

For instance, referring to FIG. 10(*a*), it is assumed that the execution screen 510 outputted on the activated area of the touch screen 151 includes a whole preview image captured by the camera 121. And, referring to FIG. 10(*b*), if a user moves a position of a thumb of a left hand holding the mobile terminal 100 toward the inside of the touch screen 151 compared to a case of FIG. 10(*a*), a size of the activated area of the touch screen 151 can be reduced according to movement of a specific point on which the first touch input is detected on the touch screen 151. In this case, the execution screen 510 outputted on the activated area of the touch screen 151 can include only a portion of the preview image captured by the camera 121 as the size of the activated area of the touch screen 151 is reduced.

According to the present embodiment, a user may change the portion of the preview image to be included in the execution screen 510 in a manner of changing a position of the thumb of the left hand holding the mobile terminal 100 on the touch screen 151. For example, the preview image may be framed using the activated area as shown in FIG. 10. By doing so, the user can select only the portion preferred to be captured from the preview image captured by the camera 121.

Figure 11:
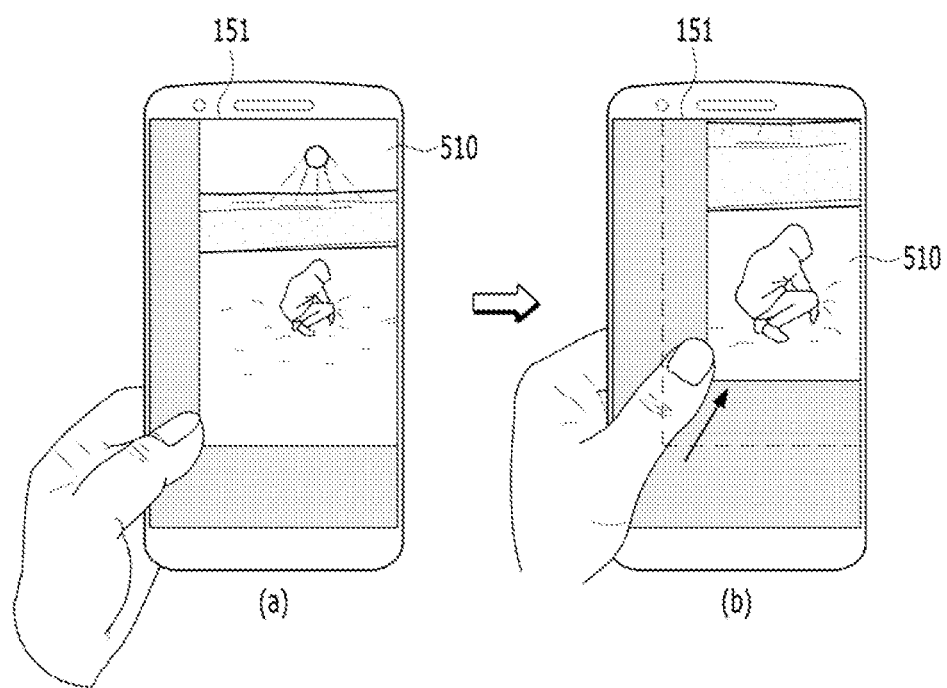
FIG. 11 is a diagram illustrating a further different example of a screen output on a display unit of a mobile terminal according to one embodiment of the present disclosure.

FIG. 11 is a diagram illustrating a further different example of a screen outputted on a display unit of a mobile terminal according to one embodiment of the present disclosure. Contents overlapped with what is mentioned earlier in FIG. 9 are omitted at this time. Following description mainly concerns difference.

The present embodiment assumes that a partial area of a touch screen 151 is activated according to a second touch input which is detected while a first touch input is maintained and an execution screen 510 of a camera application is outputted on the activated area of the touch screen 151. And, the execution screen 510 includes a preview image captured by a camera 121 in this non-limiting example.

For instance, a user can change a position of a left hand holding a mobile terminal 100. In doing so, a specific point of the touch screen 151 on which the first touch input is detected may change. If movement of the specific point of the first touch input is detected on the touch screen 151, the controller 180 can change at least one of a position or a size of the activated area of the touch screen 151.

In the present embodiment, if the position and/or the size of the activated area of the touch screen 151 changes, the execution screen 510 outputted on the activated area of the touch screen 151 may include a whole preview image captured by the camera 121 or a part of the preview image captured by the camera 121 only. In this case, if the size of the activated area of the touch screen 151 is changed, magnification of the preview image included in the execution screen 510 can be changed as well.

For instance, referring to FIG. 11(*a*), it is assumed that the execution screen 510 outputted on the activated area of the touch screen 151 includes a whole preview image captured by the camera 121. And, referring to FIG. 11(*b*), if a user moves a position of a thumb of a left hand holding the mobile terminal 100 toward the inside of the touch screen 151 compared to a case of FIG. 11(*a*), a size of the activated area of the touch screen 151 can be reduced according to movement of a specific point on which the first touch input is detected on the touch screen 151. In this case, the execution screen 510 outputted on the activated area of the touch screen 151 can include a part only among the preview image captured by the camera 121 as the size of the activated area of the touch screen 151 is reduced. And, as the size of the activated area of the touch screen 151 is reduced, magnification of the preview image included in the execution screen 510 can be enlarged. In particular, according to the present embodiment, if the size of the activated area of the touch screen 151 is reduced, a zoom-in function of the camera 121 can be executed. On the contrary, if the size of the activated area of the touch screen 151 increases, a zoom-out function of the camera 121 can be executed.

According to the present embodiment, a user is not only able to change a part of a preview image to be included in the execution screen 510, but is also able to control magnification of the preview image in a manner of changing a position of a thumb of a left hand holding the mobile terminal 100 on the touch screen 151.

Figure 12:
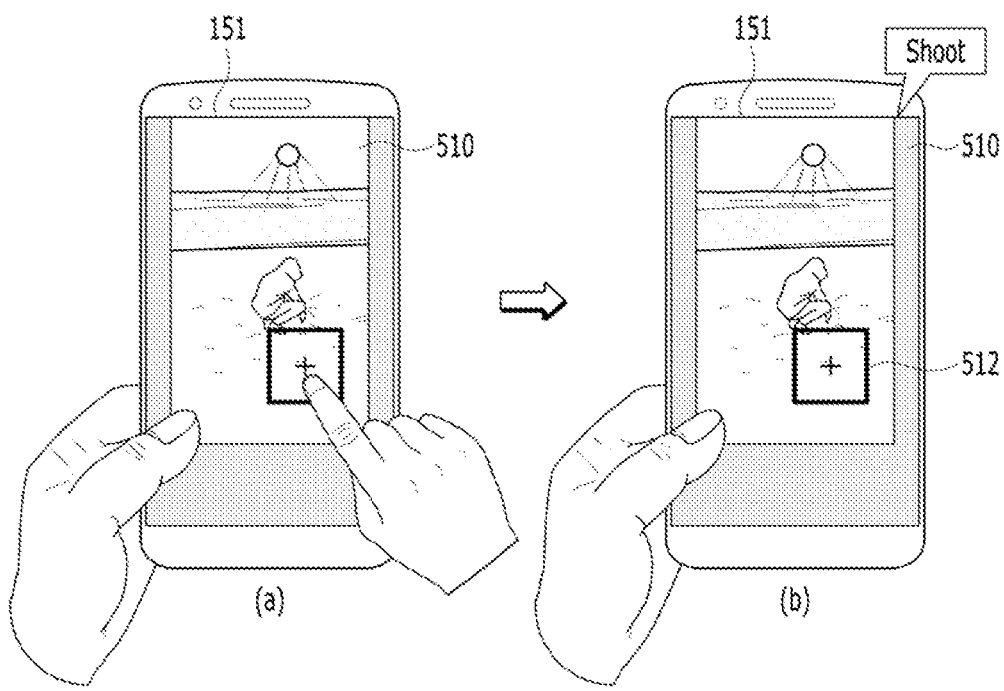
FIG. 12 is a diagram illustrating a further different example of a screen output on a display unit of a mobile terminal according to one embodiment of the present disclosure.

FIG. 12 is a diagram illustrating a further different example of a screen outputted on a display unit of a mobile terminal according to one embodiment of the present disclosure.

The present embodiment assumes that a partial area of a touch screen 151 is activated according to a second touch input which is detected while a first touch input is maintained and an execution screen 510 of a camera application is outputted on the activated area of the touch screen 151. And, the execution screen 510 includes a preview image captured by a camera 121.

Referring to FIG. 12(a), a controller 180 can detect a third touch input touching the activated area of the touch screen 151 in a state in which the first touch input is maintained. And, the controller 180 can control the camera 121 to focus on the basis of a point on which the third touch input is detected on the preview image included in the execution screen 510. Depending on the embodiment, when the third touch input is detected, an indicator 512 indicating that a focus is configured on the basis of the point on which the third touch input is detected can be displayed on the execution screen 510.

Referring to FIG. 12(b), the controller 180 may detect release of the third touch input in the state that the first touch input is maintained and can control the camera 121 to capture a preview image included in the execution screen 510 when the third touch input is released.

According to the present embodiment, a user can touch an area preferred to be focused among a preview image included in the execution screen 510 by a hand and is able to easily capture a picture by releasing the touch of the hand on a moment of capturing an image.

Figure 13:
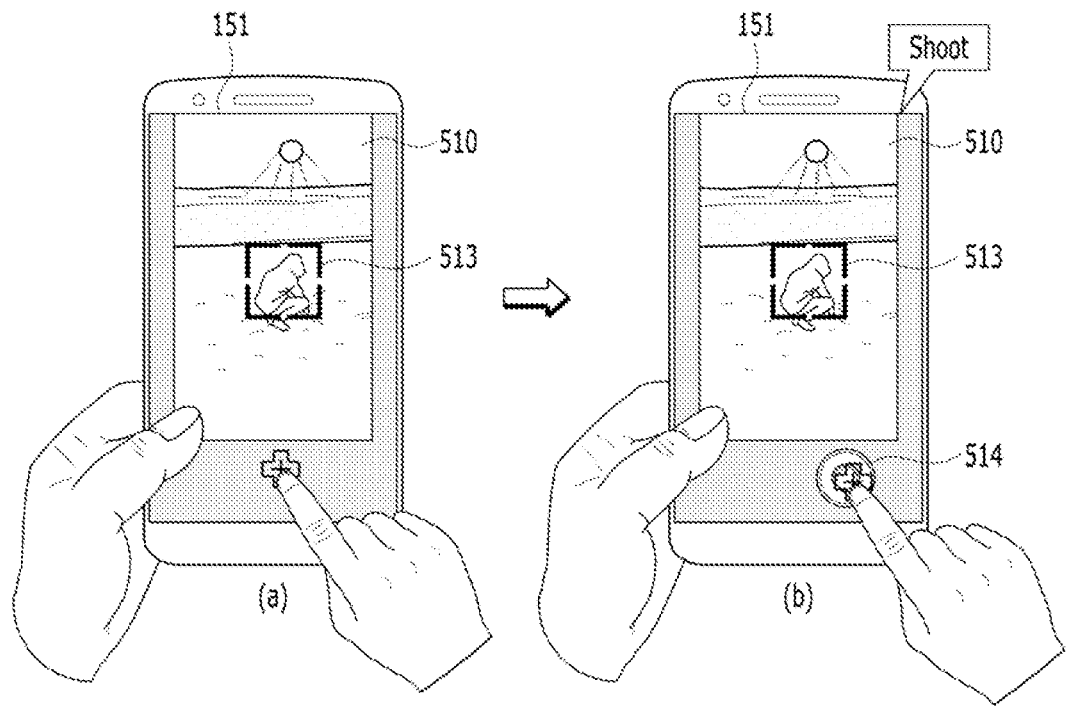
FIG. 13 is a diagram illustrating a further different example of a screen output on a display unit of a mobile terminal according to one embodiment of the present disclosure.

FIG. 13 is a diagram illustrating a further different example of a screen outputted on a display unit of a mobile terminal according to one embodiment of the present disclosure.

The present embodiment assumes that a partial area of a touch screen 151 is activated according to a second touch input which is detected while a first touch input is maintained and an execution screen 510 of a camera application is outputted on the activated area of the touch screen 151. And, the execution screen 510 includes a preview image captured by a camera 121.

Referring to FIG. 13(a), a controller 180 can detect a third touch input touching the inactivated area of the touch screen 151 in a state in which the first touch input is maintained. And, the controller 180 can control the camera 121 to execute an autofocus function according to the detected third touch input. Depending on the embodiment, when the third touch input is detected, an indicator 513 indicating that an autofocus is configured can be displayed on the execution screen 510. Moreover, the third touch input may also be on the activated area in other embodiments.

Referring to FIG. 13(b), the controller 180 may detect a release of the third touch input in the state that the first touch input is maintained and can control the camera 121 to capture a preview image included in the execution screen 510 when the third touch input is released.

Depending on the embodiment, if autofocus configuration is completed, the controller 180 can control the touch screen 151 to output an icon 514 corresponding to a picture capturing function on an inactivated area. The icon 514 can be outputted on the inactivated area until release of the third touch input is detected.

According to the present embodiment, a user can automatically focus on a random point in an inactivated area of the touch screen 151 by touching the random point by hand and is able to easily capture a picture by releasing the touch of the hand on a moment of capturing an image.

Figure 14:
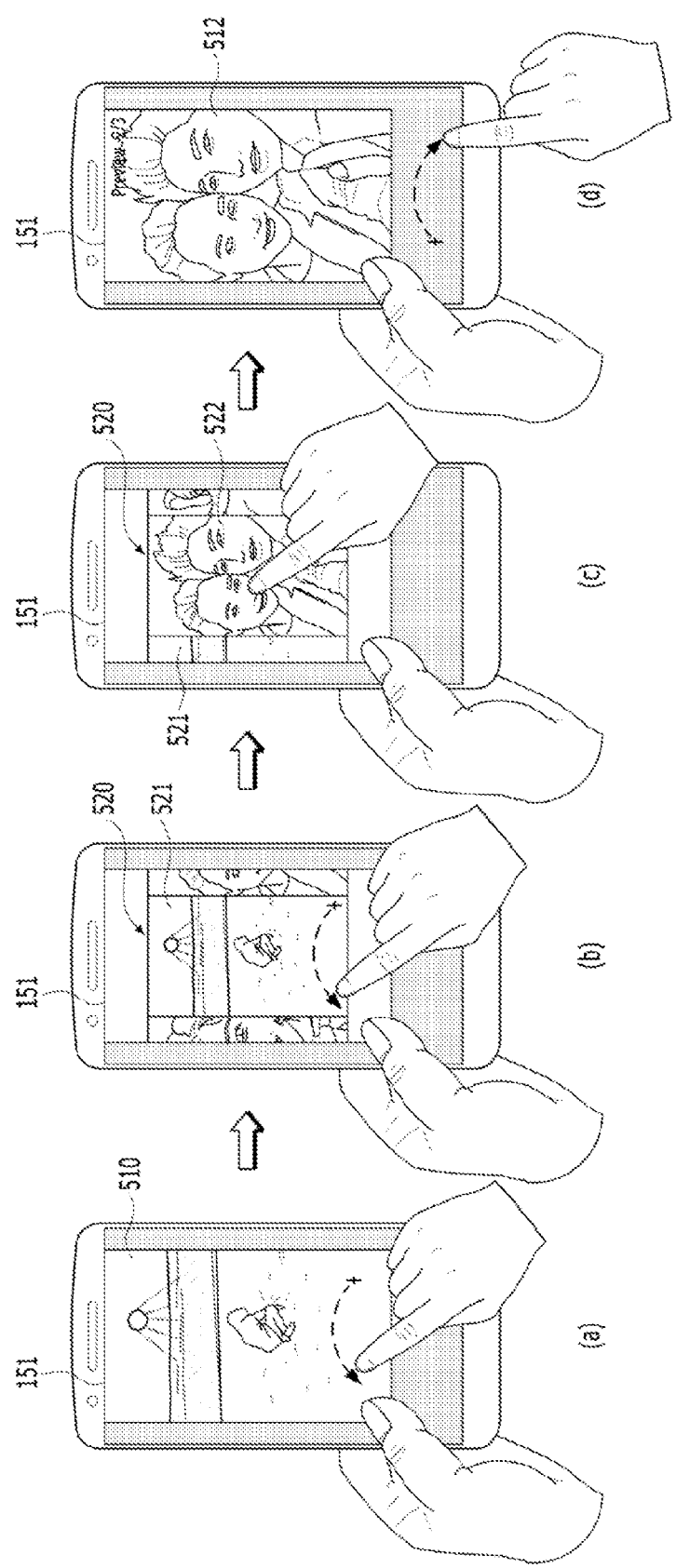
FIG. 14 is a diagram illustrating a further different example of a screen output on a display unit of a mobile terminal according to one embodiment of the present disclosure.

FIG. 14 is a diagram illustrating a further different example of a screen outputted on a display unit of a mobile terminal according to one embodiment of the present disclosure.

The present embodiment assumes that a partial area of a touch screen 151 is activated according to a second touch input which is detected while a first touch input is maintained and an execution screen 510 of a camera application is outputted on the activated area of the touch screen 151. And, the execution screen 510 includes a preview image captured by a camera 121.

Referring to FIG. 14(a), a controller 180 can detect a third touch input touching an activated area or an inactivated area of the touch screen 151 in a state in which the first touch input is maintained. As an example, assume that the third touch input corresponds to a touch input touching a point of the activated area of the touch screen 151 and flicking the touch input in the left direction.

Referring to FIG. 14(b), the controller 180 may control the camera 121 to execute a picture preview function and can output a screen 520 including previously captured images on the activated area of the touch screen 151. A plurality of previously captured images can be arranged in the screen 520 in chronological order. And, a most recently captured image 521 can be positioned at the center of the screen 520.

The controller 180 can detect a fourth touch input touching the screen 520 in the state that the first touch input is maintained. As an example, the fourth touch input may correspond to a touch input touching a random point of the screen 520 and flicking the touch input in the left direction.

Referring to FIG. 14(c), the controller 180 can place an image 522, which is captured immediately before the most recently captured image 521, at the center of the screen 520 according to the detected fourth touch input. And, the most recently captured image 521 may move to the left in the screen 520. Hence, only a right part of the image 521 is outputted on the screen 520.

The controller 180 can detect a fifth touch input selecting an image 522 from the screen 520 in the state that the first touch input is maintained.

Referring to FIG. 14(d), the controller 180 can output the image 522 on the activated area of the touch screen 151 in a manner of enlarging the image according to the detected fifth touch input.

And, the controller 180 can detect a sixth touch input touching the activated area or the inactivated area of the touch screen 151 while the first touch input is maintained. As an example, assume that the sixth touch input corresponds to a touch input touching a point of the inactivated area of the touch screen 151 and flicking the touch input in the right direction.

The controller 180 controls the camera 121 to terminate the picture preview function according to the detected sixth touch input. As shown in FIG. 14(a), the controller can output the execution screen 510 including a preview image captured by the camera 121 on the activated area of the touch screen 151 again.

Depending on the embodiment, referring to FIG. 14(a), if the third touch input is detected, the controller 180 controls the camera 121 to execute the picture preview function and can immediately output the most recently captured image 521 on the activated area of the touch screen 151.

According to the present embodiment, a user can easily switch a mode between a picture capturing mode and a picture preview mode according to a predetermined touch input.

Figure 15:
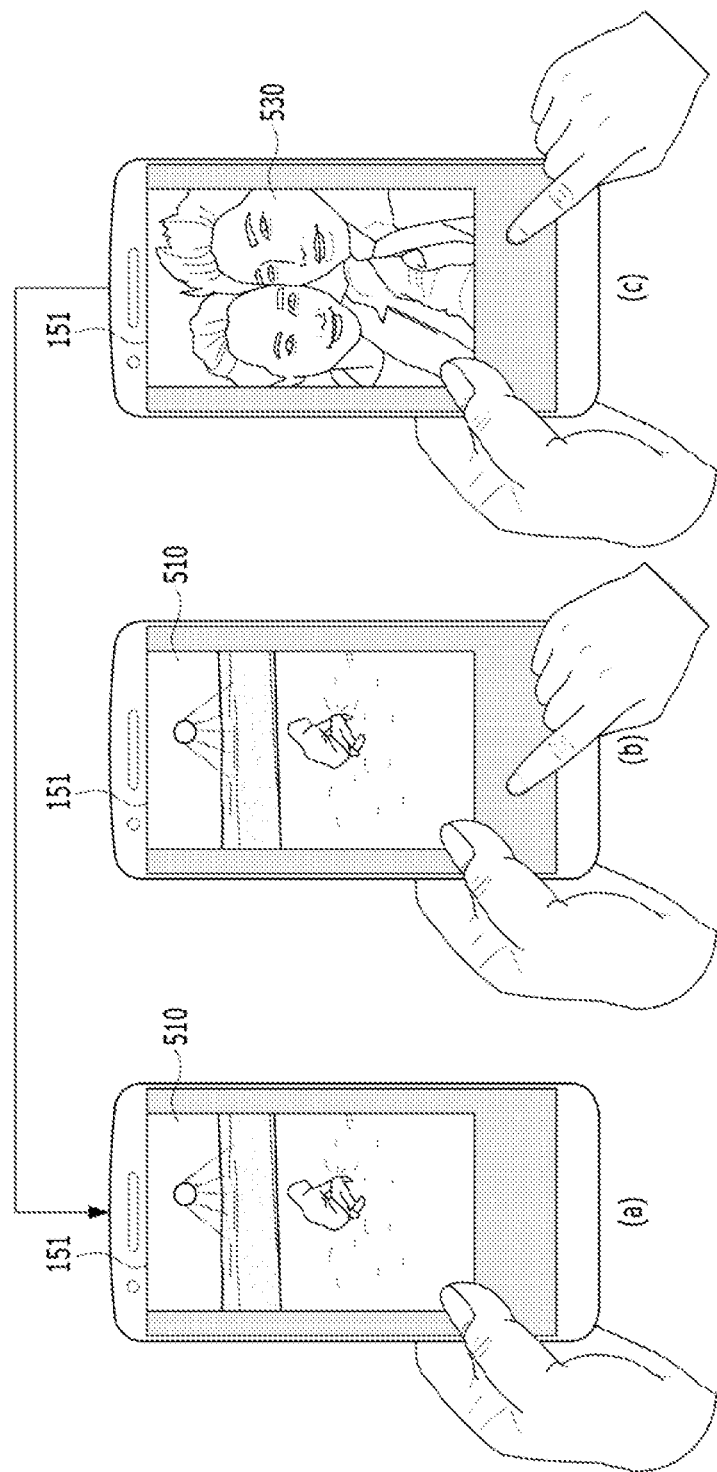
FIG. 15 is a diagram illustrating a further different example of a screen output on a display unit of a mobile terminal according to one embodiment of the present disclosure.

FIG. 15 is a diagram illustrating a further different example of a screen outputted on a display unit of a mobile terminal according to one embodiment of the present disclosure.

The present embodiment assumes that a partial area of a touch screen 151 is activated according to a second touch input which is detected while a first touch input is maintained and an execution screen 510 of a camera application is outputted on the activated area of the touch screen 151.

Referring to FIG. 15(a), the execution screen 510 outputted on the activated area of the touch screen 151 may include a preview image captured by a rear camera 121b.

Referring to FIG. 15(b), it is able to detect a third touch input touching an activated area or an inactivated area of the touch screen 151 in the state that the first touch input is maintained. As an example, the third touch input may correspond to a touch input touching a point of the inactivated area of the touch screen 151 and flicking the touch input in the left direction.

Referring to FIG. 15(c), the controller 180 may control the camera 121 to execute a front/rear camera switching function and can output an execution screen 530 including a preview mage captured by a front camera 121a on the activated area of the touch screen 151.

And, the controller 180 can detect a fourth touch input touching the activated area or the inactivated area of the touch screen 151 in the state that the first touch input is maintained. As an example, the fourth touch input may correspond to a touch input touching a point of the inactivated area of the touch screen 151 and flicking the touch input in the right direction.

The controller 180 may control the camera 121 to execute the front/rear camera switching function according to the detected fourth touch input. As shown in FIG. 15(a), the controller can output an execution screen 510 including a preview image captured by a rear camera 121b on the activated area of the touch screen 151.

According to the present embodiment, a user can easily switch between the front camera and the rear camera according to a predetermined touch input.

Figure 16:
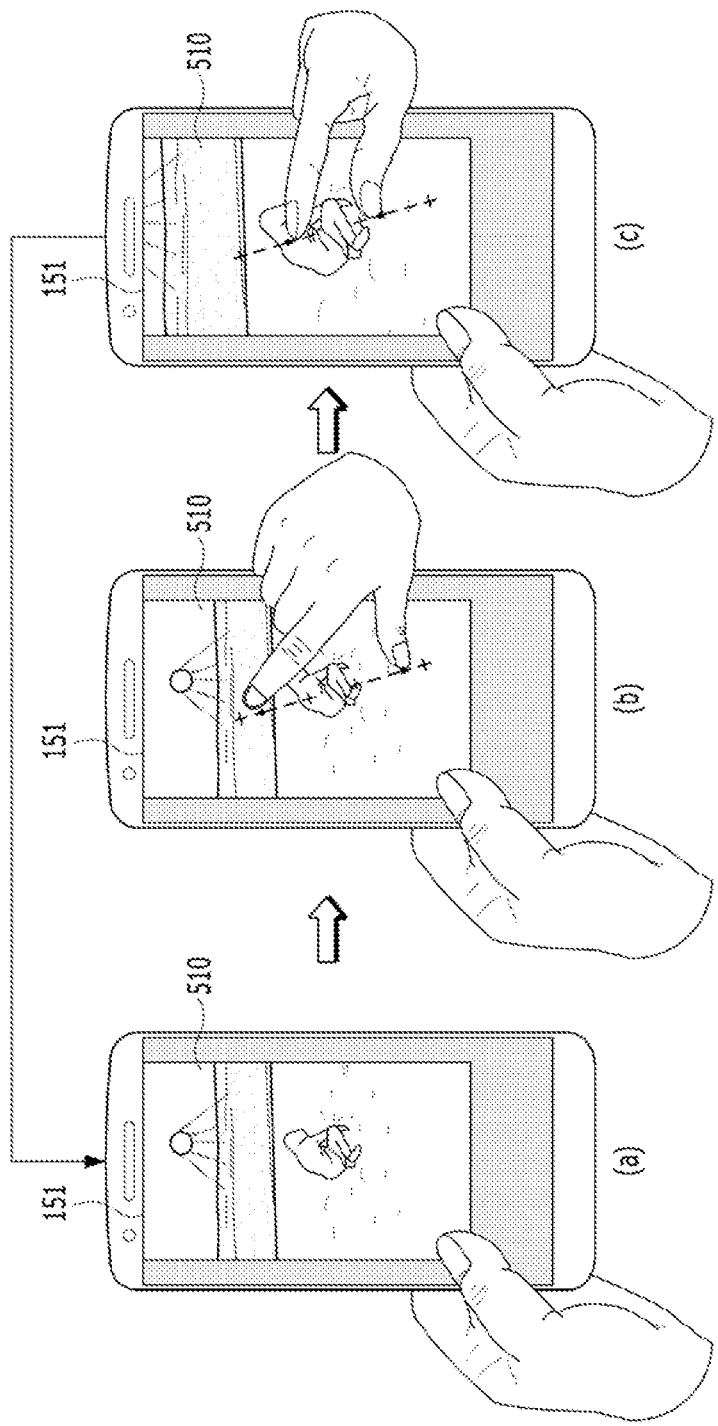
FIG. 16 is a diagram illustrating a further different example of a screen output on a display unit of a mobile terminal according to one embodiment of the present disclosure.

FIG. 16 is a diagram illustrating a further different example of a screen outputted on a display unit of a mobile terminal according to one embodiment of the present disclosure.

The present embodiment assumes that a partial area of a touch screen 151 is activated according to a second touch input which is detected while a first touch input is maintained and an execution screen 510 of a camera application is outputted on the activated area of the touch screen 151.

Referring to FIG. 16(a), the execution screen 510 outputted on the activated area of the touch screen 151 may include a preview image captured by a camera 121.

Referring to FIG. 16(b), it is able to detect a third touch input touching an activated area or an inactivated area of the touch screen 151 in the state that the first touch input is maintained. As an example, the third touch input may correspond to a touch input touching two points of the activated area of the touch screen 151 at the same time and flicking the touch input toward the outside of the touch screen 151.

Referring to FIG. 16(c), a controller 180 may control the camera 121 to execute a zoom-in function according to the detected third touch input and can output an execution screen 510 including a preview image magnified from the preview image included in the execution screen 510 of FIG. 16(b) on the activated area of the touch screen 151.

And, the controller 180 can detect a fourth touch input touching the activated area or the inactivated area of the touch screen 151 in the state that the first touch input is maintained. As an example, the fourth touch input may correspond to a touch input touching two points of the activated area of the touch screen 151 at the same time and flicking the touch input toward the inside of the touch screen 151.

The controller 180 may control the camera 121 to execute a zoom-out function according to the detected fourth touch input and may output the execution screen 510 including a preview image such as the preview image shown in FIG. 16(a) on the activated area of the touch screen 151 again.

According to the present embodiment, a user is able to easily execute the zoom-in/zoom-out function of the camera 121 according to a predetermined touch input.

Figure 17:
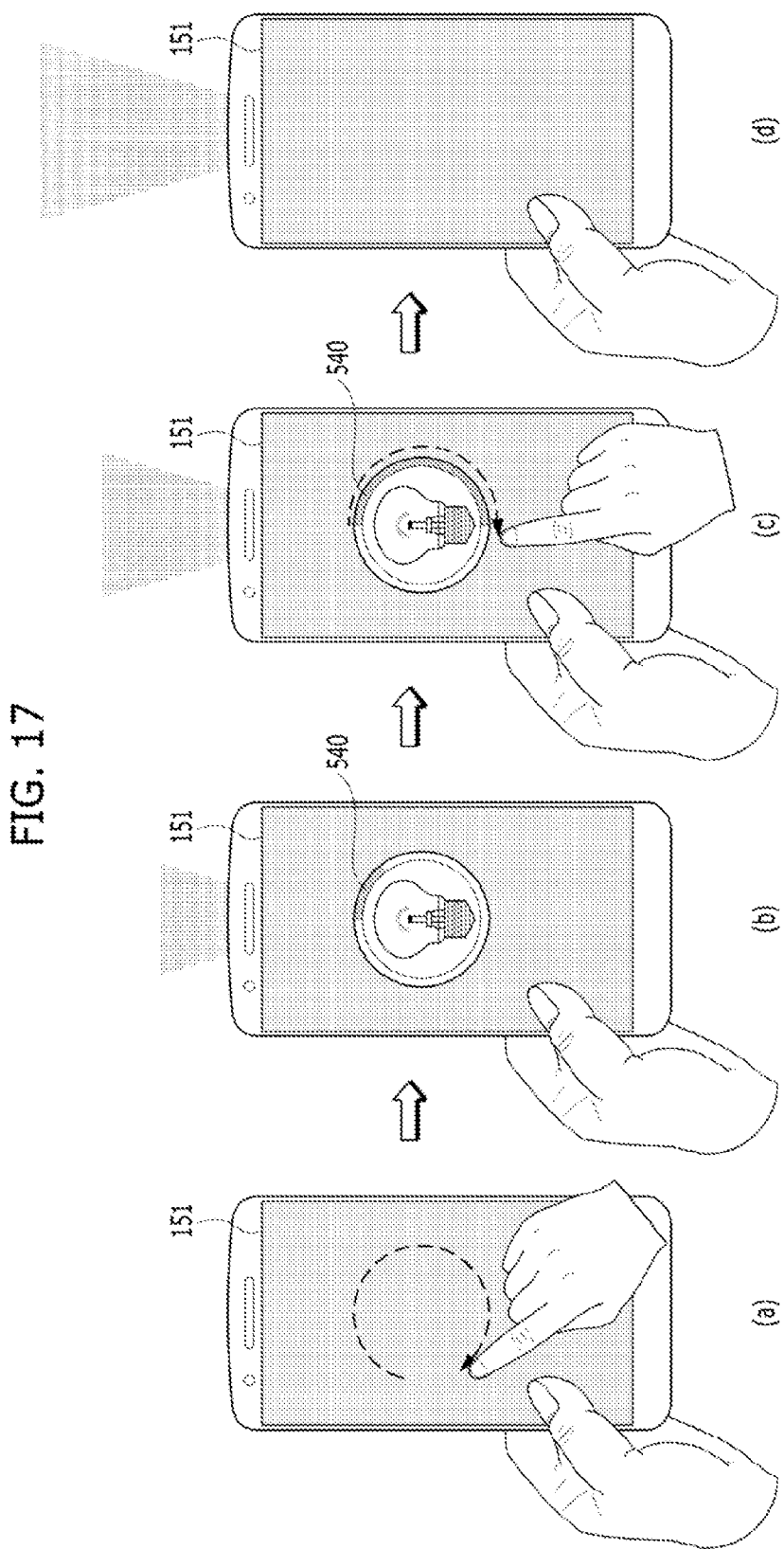
FIG. 17 is a diagram illustrating an example of a screen output on a display unit of a mobile terminal according to one embodiment of the present disclosure.

FIG. 17 is a diagram illustrating an example of a screen outputted on a display unit of a mobile terminal according to one embodiment of the present disclosure.

Referring to FIG. 17(a), a controller 180 of a mobile terminal 100 detects a first touch input touching a random point of an inactivated touch screen 151. And, the controller 180 detects a second touch input touching the inactivated touch screen 151 in a state in which the first touch input is maintained. As an example, assume that the second touch input corresponds to a touch input touching a point of the inactivated touch screen 151 and dragging the touch input in a clockwise direction.

Referring to FIG. 17(b), the controller 180 may activate a partial area of the touch screen 151 according to the detected second touch input and can output an execution screen 540 of a flashlight application on the activated area of the touch screen 151. The execution screen 540 may be displayed at the location of the second touch input or at a predetermined position. The size/shape of the execution screen 540 may also depend on the size/shape of the second input. And, the controller 180 can control an optical output module 154 to output light of specific brightness. The specific brightness may correspond to base brightness of light initially outputted from the optical output module 154 when the flashlight application is executed.

Referring to FIG. 17(c), the controller 180 can detect a third touch input touching the touch screen 151 in the state that the first touch input is maintained. As an example, the third touch input may correspond to a touch input touching a point of the touch screen 151 and dragging the touch input in a clockwise direction or an anti-clockwise direction according to a circumference of the execution screen 540.

The controller 180 can control the brightness of the light outputted from the optical output module 154 according to the detected third touch input. For instance, if the third touch input corresponds to a touch input touching a point of the touch screen 151 and dragging the touch input in a clockwise direction according the circumference of the execution screen 540, the controller controls the optical output module 154 to increase the brightness of the outputted light. If the third touch input corresponds to a touch input touching a point of the touch screen 151 and dragging the touch input in an anti-clockwise direction according the circumference of the execution screen 540, the controller can control the optical output module 154 to decrease the brightness of the outputted light.

Depending on the embodiment, referring to FIG. 17(*d*), if no touch input is detected except the first touch input, the controller 180 inactivates the touch screen 151 and can control the optical output module 154 to continuously output light of consistent brightness. And, if the first touch input is released, the controller 180 maintains the inactivated state of the touch screen 151 and can terminate the flashlight application.

Figure 18:
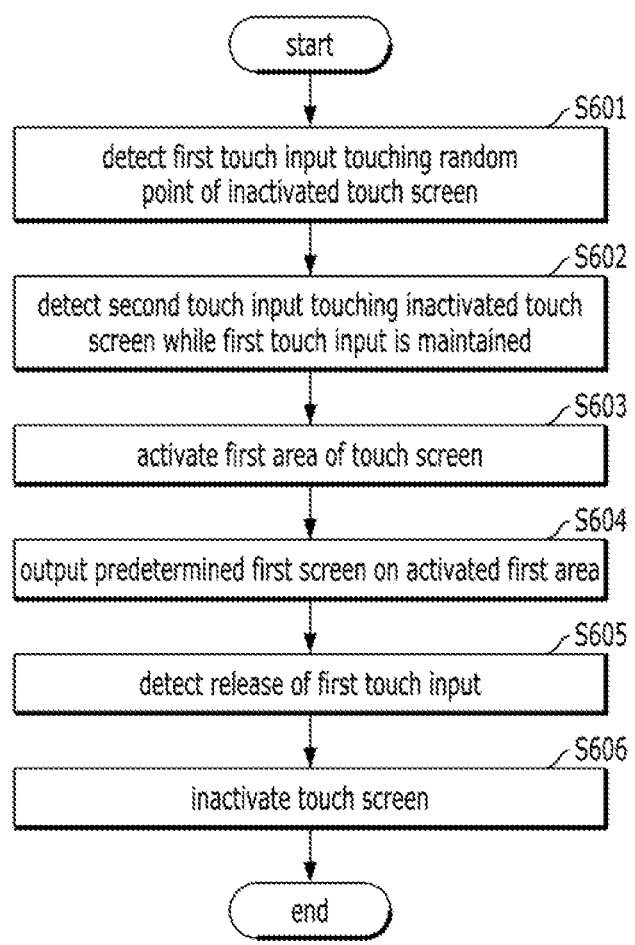
FIG. 18 is a flowchart of a method of accessing a specific application in a mobile terminal according to one embodiment of the present disclosure in a state in which a display unit is inactivated.

FIG. 18 is a flowchart of a different example of a method of accessing a specific application in a mobile terminal in a state in which a display unit is inactivated according to one embodiment of the present disclosure.

A controller 180 of a mobile terminal 100 detects a first touch input touching a random point of an inactivated touch screen 151 [S601]. When a user holds the mobile terminal 100, the user can naturally touch the touch screen 151 using a finger (e.g., a thumb). Hence, the user can take a posture of holding the mobile terminal 100 as normal. And, the user should constantly maintain an operation of touching the touch screen 151 touched by the finger according to one embodiment of the present disclosure as long as a specific function or a specific application is used.

Depending on the embodiment, a screen lock may be set to the touch screen 151 or may be not set to the touch screen. In this case, the screen lock means to set security to the touch screen to make a general function of the mobile terminal 100 unavailable unless a user inputs a predetermined password via the touch screen 151.

The controller 180 detects a second touch input touching the inactivated touch screen 151 in a state in which the first touch input is maintained [S602]. The first touch input can be maintained on the touch screen in a manner that the first touch input is continuously detected on the random point where the first touch input is firstly detected or a point on which the first touch input is detected is moving on the touch screen 151.

The second touch input can include at least one of a touch input touching a point of the inactivated touch screen 151, a touch input touching a point of the inactivated touch screen 151 and dragging (e.g., including a straight line dragging or a curve line dragging) in a random direction, a touch input touching a point of the inactivated touch screen 151 and flicking in a random direction and a touch input touching a plurality of points of the inactivated touch screen 151 in a predetermined order. Depending on the embodiment, if the second touch input corresponds to a touch input touching a plurality of points of the inactivated touch screen according to a predetermined order, the second touch input may be matched with a password used for unlocking a screen lock set to the touch screen 151.

The controller 180 activates a first area of the touch screen 151 according to the detected second touch input [S603]. The first area corresponds to a partial area of the touch screen 151 and may correspond to an area including a point of the touch screen 151 on which the second touch input is detected. Depending on the embodiment, if the second touch input is matched with the password used for unlocking the screen lock set to the touch screen 151, the controller 180 can unlock a screen lock set to the first area of the touch screen 151.

Subsequently, the controller 180 may output a predetermined first screen on the activated first area [S604]. The first screen may correspond to one of a lock screen, a home screen, an execution screen of a predetermined widget application, and a screen which is outputted immediately before the touch screen 151 is inactivated. In this case, the lock screen may indicate a screen corresponding to the first area among screens predetermined to be outputted on the touch screen 151 when the touch screen 151 is activated in a state in which a screen lock of the touch screen is not unlocked. And, the home screen or the screen which is outputted immediately before the touch screen 151 is inactivated may indicate a screen corresponding to the first area among screens predetermined to be outputted on the touch screen 151 in a state in which the screen lock set to the touch screen 151 is unlocked. Meanwhile, if release of the first touch input is detected [S605], the controller 180 inactivates the touch screen 151 [S606]. If the release of the first touch input is detected at any time of performing the step S603 or the step S604 or after the step S604, the controller 180 can inactivate the touch screen 151.

In the following, examples of the method mentioned earlier in FIG. 18 are explained in more detail with reference to FIG. 19 to FIG. 30.

Figure 19:
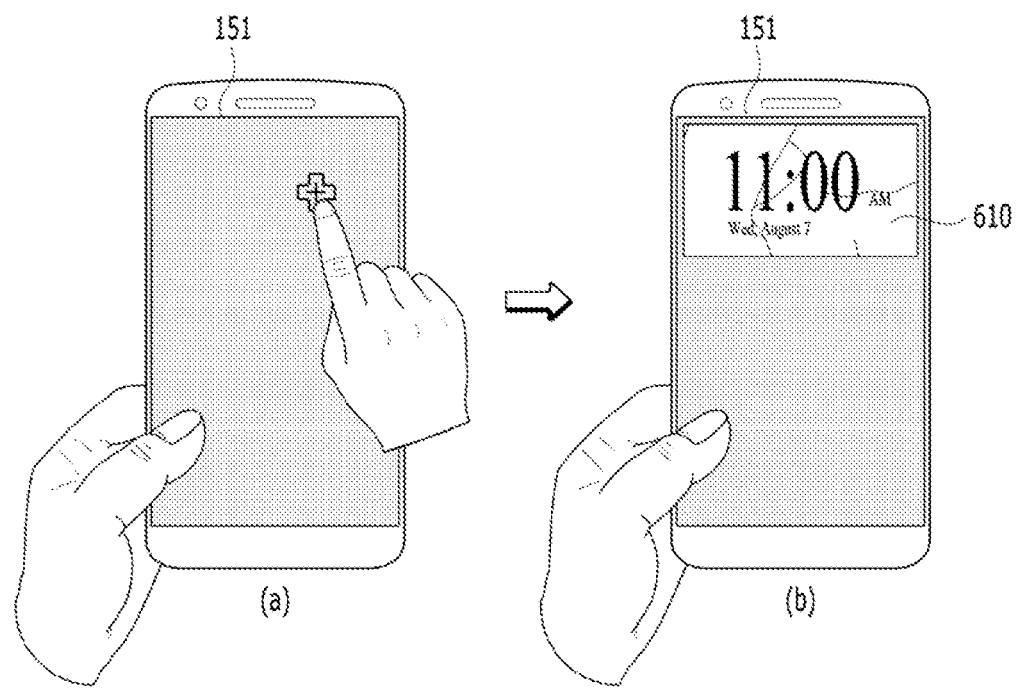
FIG. 19 is a diagram illustrating an example of a screen output on a display unit of a mobile terminal according to one embodiment of the present disclosure.

FIG. 19 is a diagram illustrating an example of a screen outputted on a display unit of a mobile terminal according to one embodiment of the present disclosure.

Referring to FIG. 19(*a*), a controller 180 of a mobile terminal 100 detects a first touch input touching a random point of an inactivated touch screen 151. As an example, assume that the first touch input corresponds to a touch input touching a point of the touch screen 151 with a thumb while a user is holding the mobile terminal 100 with a left hand. Of course, the user may hold the mobile terminal 100 with a right hand depending on the embodiment. In this case, it is apparent that embodiments of the present disclosure can be identically applied.

Subsequently, the controller 180 detects a second touch input touching the inactivated touch screen 151 in a state in which the first touch input is maintained. As an example, the second touch input may correspond to a touch input touching a point of the inactivated touch screen 151.

Referring to FIG. 19(*b*), the controller 180 activates a first area of the touch screen 151 according to the detected second touch input and outputs a predetermined first screen 610 on the activated first area. The first area may correspond to an area including a point of the touch screen 151 on which the second touch input is detected. And, the first screen may correspond to one of a lock screen, a home screen, an execution screen of a predetermined widget application, and a screen which is outputted immediately before the touch screen 151 is inactivated.

Although it is not depicted, the controller 180 can inactivate the touch screen 151 when release of the first touch input is detected at any time.

Figure 20:
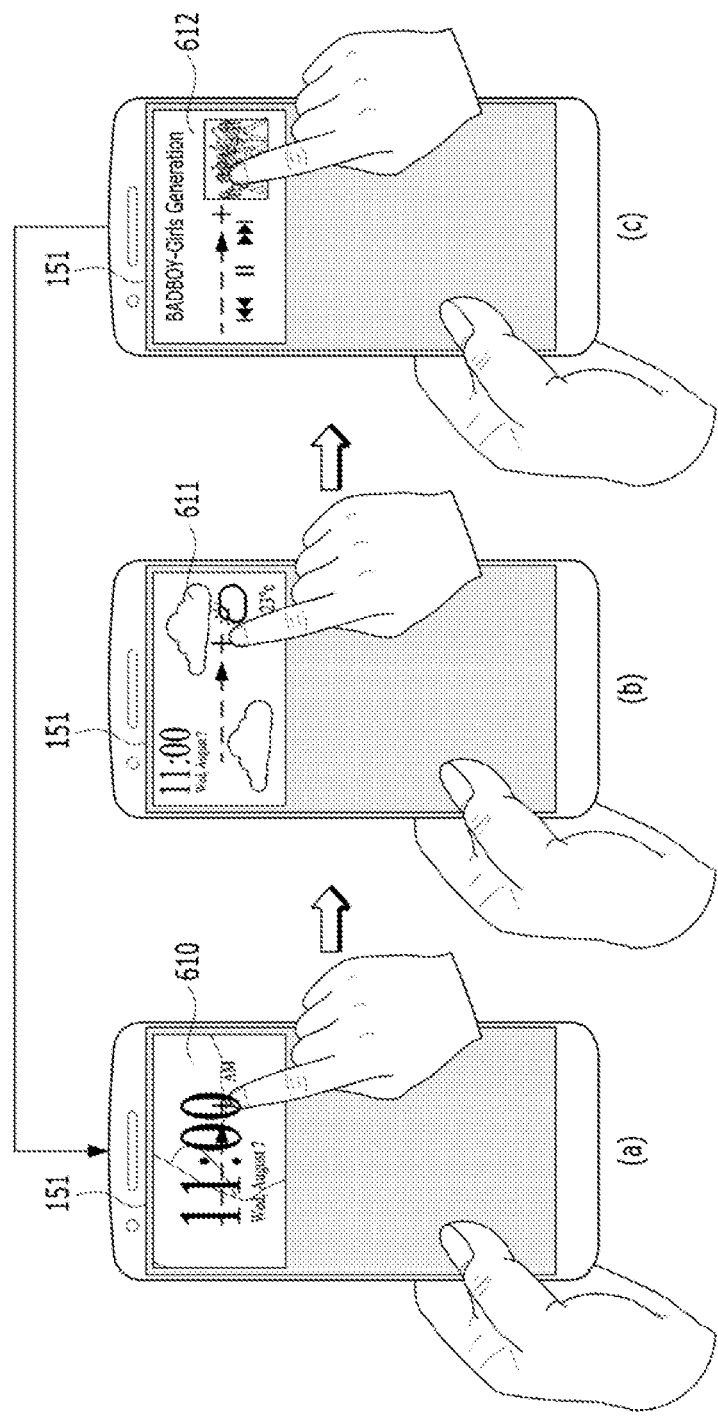
FIG. 20 is a diagram illustrating a different example of a screen output on a display unit of a mobile terminal according to one embodiment of the present disclosure.

FIG. 20 is a diagram illustrating a different example of a screen outputted on a display unit of a mobile terminal according to one embodiment of the present disclosure. Contents overlapped with what is mentioned earlier in FIG. 19 are omitted at this time. Following description mainly concerns difference.

Referring to FIG. 20(*a*), if the second touch input is detected in the state that the first touch input is maintained, the controller 180 of the mobile terminal 100 activates a first area and can output a predetermined lock screen 610 on the activated first area.

The controller 180 may detect a third touch input touching the lock screen 610 outputted on the activated first area in the state that the first touch input is maintained. As an example, the third touch input may correspond to a touch input touching a point of the first area and dragging the touch input in a random direction.

Referring to FIG. 20(*b*), the controller 180 may execute a predetermined first widget application according to the detected third touch input and may output an execution screen 611 of the first widget application on the activated first area. As an example, the first widget application may correspond to a weather widget application.

The controller 180 detects the third touch input touching the execution screen 611 outputted on the activated first area in the state that the first touch input is maintained.

Referring to FIG. 20(*c*), the controller 180 may execute a predetermined second widget application according to the detected third touch input and can output an execution screen of the second widget application on the activated first area. As an example, the second widget application may correspond to a music playback application.

The controller 180 may detect the third touch input touching an execution screen 612 outputted on the activated first area in the state that the first touch input is maintained.

As shown in FIG. 20(*a*), the controller 180 can output the predetermined lock screen 610 on the activated first area again according to the detected third touch input.

Whenever the third touch input is detected in the state that the first touch input is maintained, the controller 180 can repeatedly output the execution screen 612 of the first widget application and the execution screen 612 of the second widget application in turn. Yet, the number of execution screens of widget application capable of being outputted after that lock screen 610 may vary depending on the embodiment.

Although it is not depicted, if a third touch input touching a point of the first area and dragging the touch input in a random direction is detected, the controller 180 can repeatedly output images corresponding to each of applications, which have a history of being used in predetermined duration, on the first area in turn whenever the third touch input is detected depending on the embodiment.

And, although it is not depicted, depending on the embodiment, the controller 180 can detect a fourth touch input touching a plurality of points of the first area in a predetermined order. In this case, the fourth touch input may be matched with a password used for unlocking a screen lock set to the touch screen 151. If the fourth touch input is detected, the controller 180 unlocks a screen lock set to the first area and can output an execution screen of a most recently used application on the first area. When the execution screen of the most recently used application is outputted on the first area, if a third touch input touching a point of the first area and dragging the touch input in a random direction is detected, the controller 180 can repeatedly output images corresponding to each of applications, which have a history of being used in predetermined duration, on the first area in turn whenever the third touch input is detected.

And, although it is not depicted, if a fourth touch input is detected, the controller 180 unlocks a screen lock set to the first area and can output a specific page, which is outputted immediately before the touch screen 151 is activated, among a plurality of pages constructing a home screen on the first area. When the specific page is outputted on the first area, if a third touch input touching a point of the first area and dragging the touch input in a random direction is detected, the controller 180 can repeatedly output different pages constructing the home screen on the first area in turn whenever the third touch input is detected.

Figure 21:
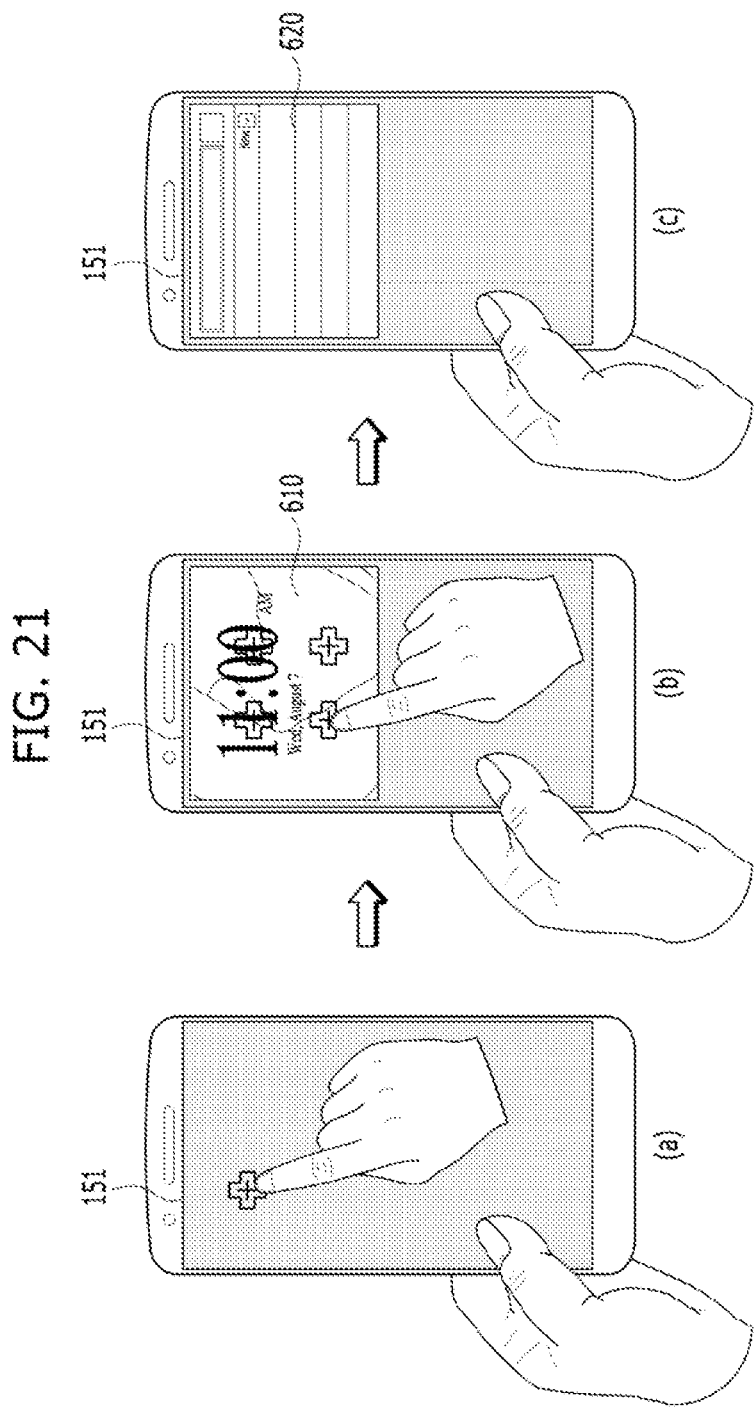
FIG. 21 is a diagram illustrating a further different example of a screen output on a display unit of a mobile terminal according to one embodiment of the present disclosure.

FIG. 21 is a diagram illustrating a further different example of a screen outputted on a display unit of a mobile terminal according to one embodiment of the present disclosure.

Referring to FIG. 21(*a*), a controller 180 of a mobile terminal 100 detects a first touch input touching a random point of an inactivated touch screen 151. And, the controller 180 detects a second touch input touching the inactivated touch screen 151 in a state in which the first touch input is maintained. As an example, the second touch input may correspond to a touch input touching a point of the inactivated touch screen 151.

Referring to FIG. 21(*b*), the controller 180 activates a first area of the touch screen 151 according to the detected second touch input and can output a predetermined lock screen 610 on the activated first area. The first area may correspond to an area including a point of the touch screen 151 on which the second touch input is detected.

The controller 180 may detect a third touch input touching the lock screen outputted on the activated first area in the state that the first touch input is maintained. As an example, the third touch input may correspond to a touch input touching a plurality of points of the first area in a predetermined order. And, the third touch input can be matched with a password used for unlocking a screen lock set to the touch screen 151.

Referring to FIG. 21(*c*), the controller 180 unlocks the screen lock set to the activated first area and can output a predetermined screen 620 on the activated first area. The predetermined screen 620 may correspond to a home screen or a screen outputted immediately before the touch screen 151 is inactivated. As an example, the predetermined screen 620 may correspond to an execution screen of a specific application which is executed immediately before the touch screen 151 is inactivated.

Figure 22:
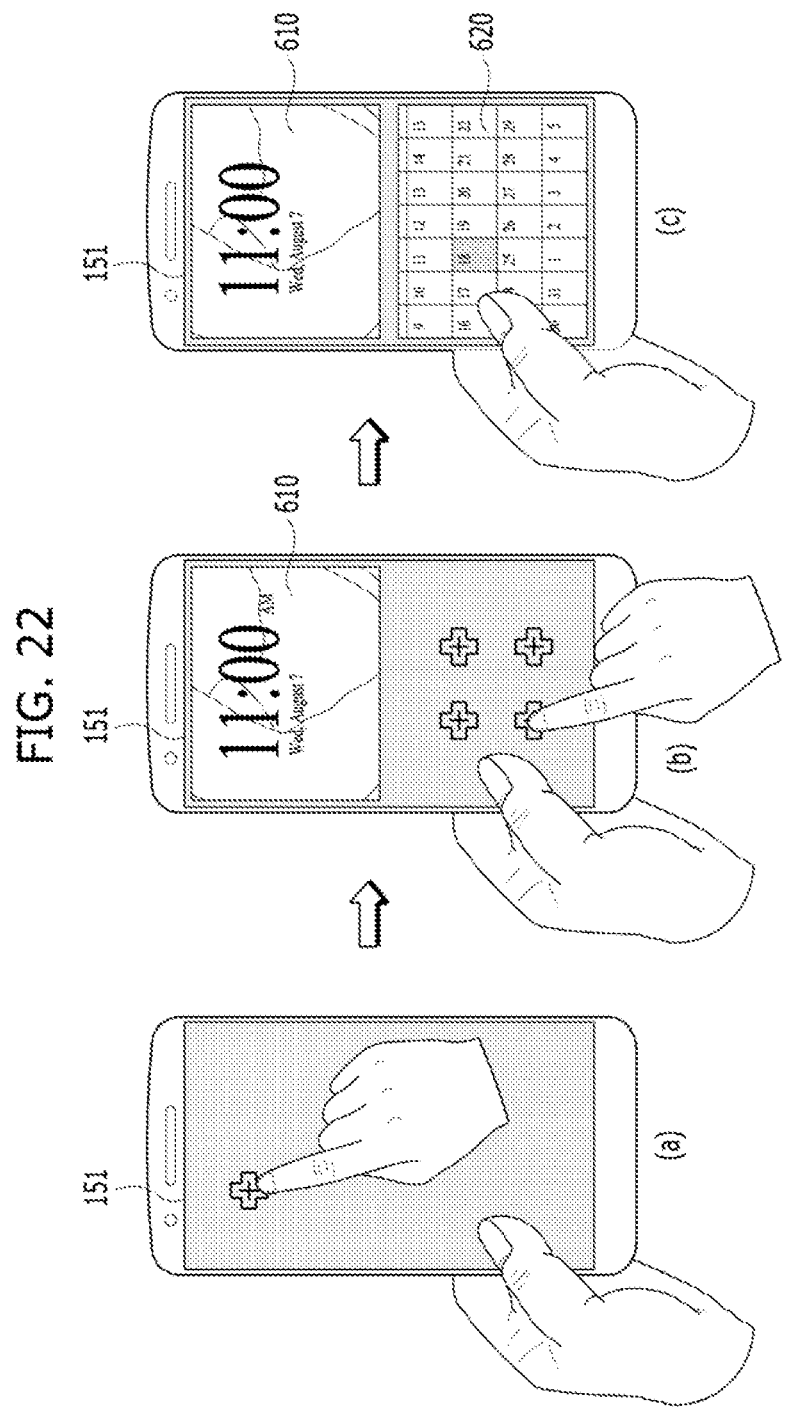
FIG. 22 is a diagram illustrating a further different example of a screen output on a display unit of a mobile terminal according to one embodiment of the present disclosure.

FIG. 22 is a diagram illustrating a further different example of a screen outputted on a display unit of a mobile terminal according to one embodiment of the present disclosure.

Referring to FIG. 22(*a*), a controller 180 of a mobile terminal 100 detects a first touch input touching a random point of an inactivated touch screen 151. And, the controller 180 detects a second touch input touching the inactivated touch screen 151 in a state in which the first touch input is maintained. As an example, the second touch input may correspond to a touch input touching a point of the inactivated touch screen 151.

Referring to FIG. 22(*b*), the controller 180 activates a first area of the touch screen 151 according to the detected second touch input and can output a predetermined lock screen 610 on the activated first area. The first area may correspond to an area including a point of the touch screen 151 on which the second touch input is detected.

The controller 180 may detect a third touch input touching an inactivated second area in the state that the first touch input is maintained. As an example, the third touch input may correspond to a touch input touching a plurality of points of the second area in a predetermined order. And, the third touch input can be matched with a password used for unlocking a screen lock set to the touch screen 151.

Referring to FIG. 22(*c*), the controller 180 may unlock a screen lock set to the inactivated second area and can activate the second area. And, the controller 180 can output a predetermined screen 620 on the activated second area. The predetermined screen 620 may correspond to a home screen or a screen outputted immediately before the touch screen 151 was previously inactivated. As an example, the predetermined screen 620 may correspond to an execution screen of a specific application which was executed immediately before the touch screen 151 was previously inactivated. Meanwhile, a state of outputting the lock screen 610 on the activated first area can be maintained.

Figure 23:
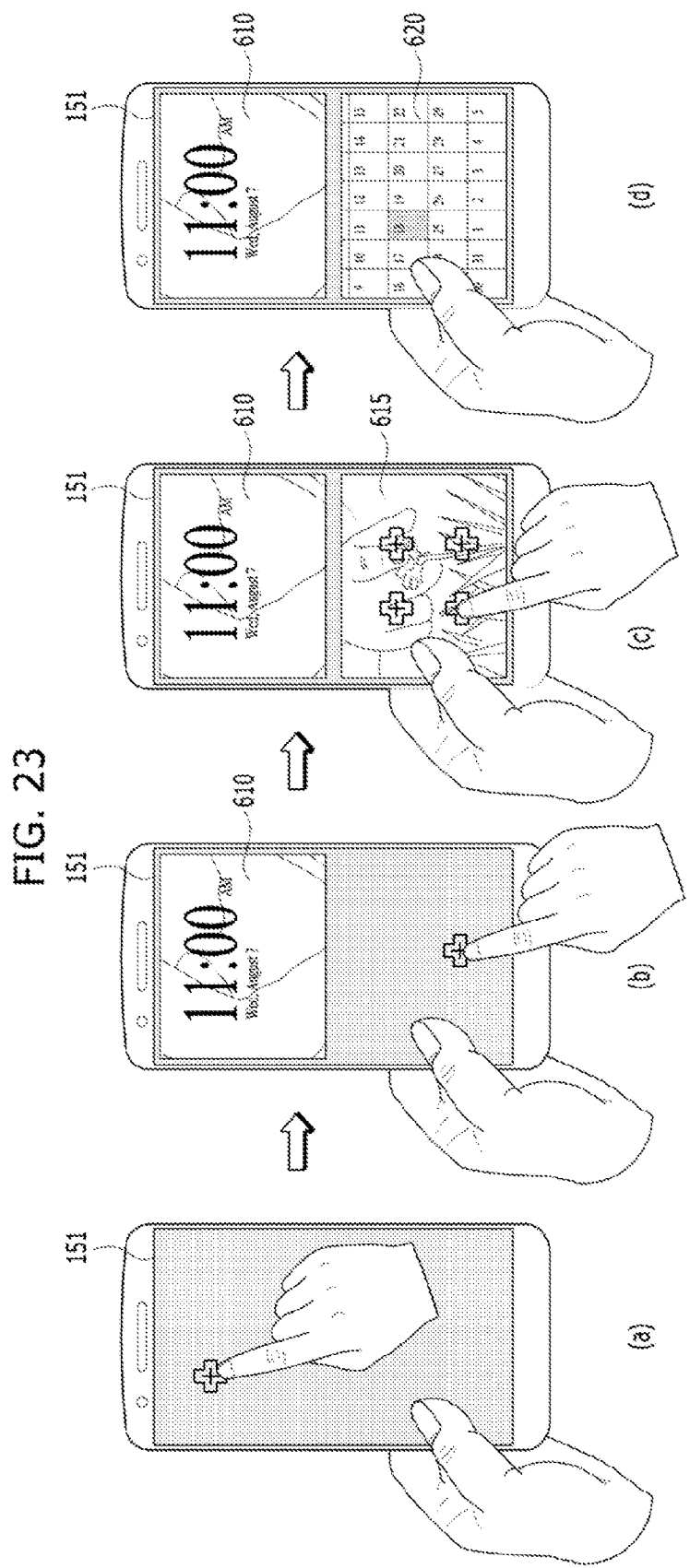
FIG. 23 is a diagram illustrating a further different example of a screen output on a display unit of a mobile terminal according to one embodiment of the present disclosure.

FIG. 23 is a diagram illustrating a further different example of a screen outputted on a display unit of a mobile terminal according to one embodiment of the present disclosure.

Referring to FIG. 23(a), a controller 180 of a mobile terminal 100 detects a first touch input touching a random point of an inactivated touch screen 151. And, the controller 180 detects a second touch input touching the inactivated touch screen 151 in a state in which the first touch input is maintained. As an example, the second touch input may correspond to a touch input touching a point of the inactivated touch screen 151.

Referring to FIG. 23(b), the controller 180 activates a first area of the touch screen 151 according to the detected second touch input and can output a predetermined lock screen 610 on the activated first area. The first area may correspond to an area including a point of the touch screen 151 on which the second touch input is detected.

The controller 180 detects a third touch input touching an inactivated second area in the state that the first touch input is maintained. As an example, the third touch input may correspond to a touch input touching a point of the second area.

Referring to FIG. 23(c), the controller 180 activates the inactivated second area and can output a predetermined lock screen 615 on the activated second area. In this case, the lock screen 610 indicates a screen corresponding to the activated first area among screens predetermined to be outputted on the touch screen 151 when a whole area of the touch screen 151 is activated in a state in which a screen lock set to the touch screen 151 is not unlocked. On the contrary, the lock screen 615 indicates a screen corresponding to the activated second area among screens predetermined to be outputted on the touch screen 151 when a whole area of the touch screen 151 is activated in a state in which a screen lock set to the touch screen 151 is not unlocked.

The controller 180 detects a fourth touch input touching the activated second area in the state that the first touch input is maintained. As an example, the fourth touch input may correspond to a touch input touching a plurality of points of the second area in a predetermined order. And, the fourth touch input can be matched with a password used for unlocking the screen lock set to the touch screen 151.

Referring to FIG. 23(d), the controller 180 unlocks the screen lock set to the activated second area and can output a predetermined screen 620 on the activated second area. The predetermined screen 620 may correspond to a home screen or a screen which was outputted immediately before the touch screen 151 was previously inactivated. As an example, the predetermined screen 620 may correspond to an execution screen of a specific application which is executed immediately before the touch screen 151 is inactivated. Meanwhile, a state of outputting the lock screen 610 on the activated first area can be maintained.

Figure 24:
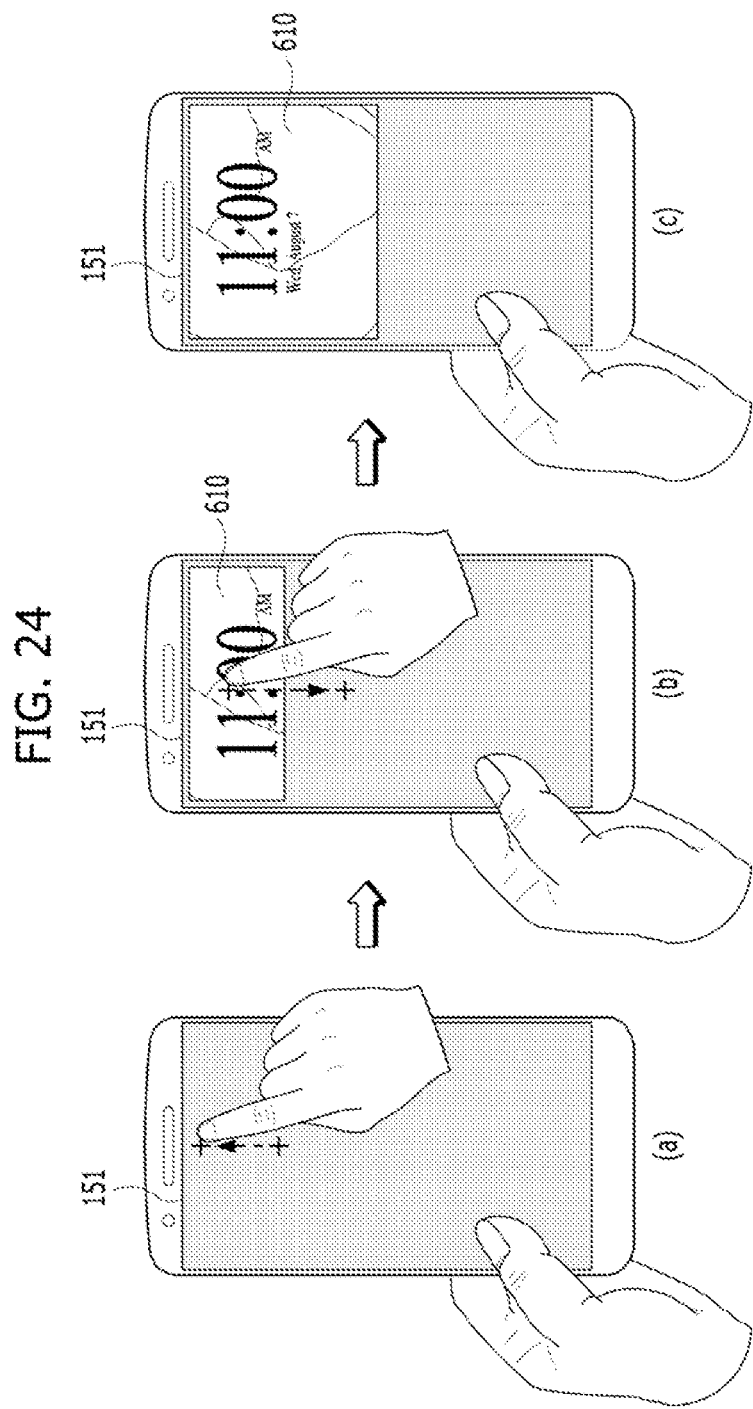
FIG. 24 is a diagram illustrating a further different example of a screen output on a display unit of a mobile terminal according to one embodiment of the present disclosure.

FIG. 24 is a diagram illustrating a further different example of a screen outputted on a display unit of a mobile terminal according to one embodiment of the present disclosure.

Referring to FIG. 24(a) a controller 180 of a mobile terminal 100 detects a first touch input touching a random point of an inactivated touch screen 151.

Subsequently, the controller 180 detects a second touch input touching the inactivated touch screen 151 in a state in which the first touch input is maintained. As an example, the second touch input may correspond to a touch input touching a point of the inactivated touch screen 151 and dragging the touch input in an up direction.

Referring to FIG. 24(b), the controller 180 may activate a first area of the touch screen 151 according to the detected second touch input and can output a predetermined lock screen 610 on the activated first area. The first area can include an area of the touch screen 151 on which the second touch input is detected. In particular, when the second touch input is detected, the first area may correspond to an area that extends from a point of the inactivated touch screen 151 touched by a user to a point on which the dragging in up direction is terminated. Depending on embodiment, the controller 180 may sequentially activate the first area from the point of the inactivated touch screen 151 touched by the user to the point on which the dragging in the up direction is terminated, and may then be able to sequentially output a predetermined lock screen 610 from the point of the inactivated touch screen 151 touched by the user to the point on which the dragging in up direction is terminated.

The controller 180 may detect a third touch input touching the touch screen 151 in the state that the first touch input is maintained. As an example, the third touch input may correspond to a touch input touching a point of the activated first area and dragging the touch input to a point of the inactivated second area of the touch screen 151. In particular, a user may touch the lock screen 610 outputted on the activated first area and may then be able to take a posture of pulling the lock screen in a down direction.

Referring to FIG. 24(c), the controller 180 can activate the touch screen 151 as much as an area including from the activated first area to the point of the inactivated second area. And, the controller 180 can output the lock screen 610 on the activated area. The lock screen 610 shown in FIG. 24(c) can include information greater than information included in the lock screen 610 shown in FIG. 24(b).

Figure 25:
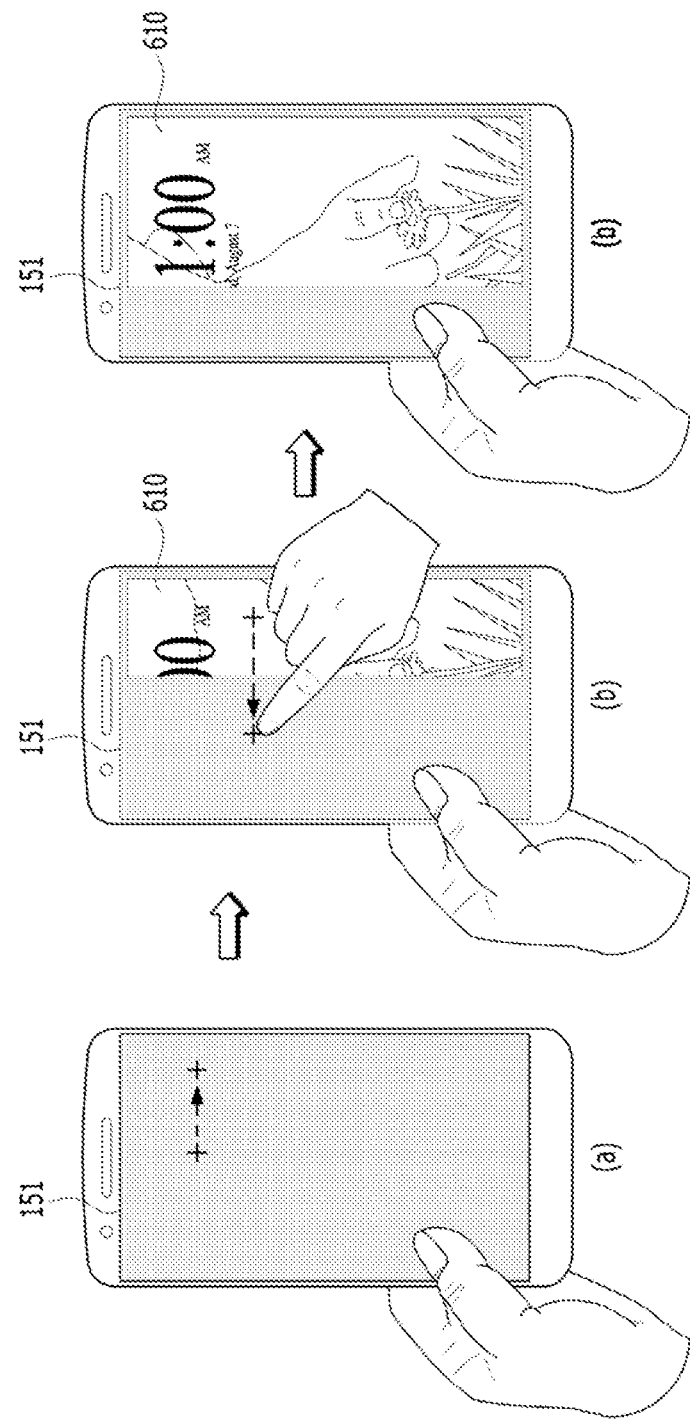
FIG. 25 is a diagram illustrating a further different example of a screen output on a display unit of a mobile terminal according to one embodiment of the present disclosure.

FIG. 25 is a diagram illustrating a further different example of a screen outputted on a display unit of a mobile terminal according to one embodiment of the present disclosure.

Referring to FIG. 25(a), a controller 180 of a mobile terminal 100 detects a first touch input touching a random point of an inactivated touch screen 151.

Subsequently, the controller 180 may detect a second touch input touching the inactivated touch screen 151 in a state in which the first touch input is maintained. As an example, the second touch input may correspond to a touch input touching a point of the inactivated touch screen 151 and dragging the touch input in a right direction.

Referring to FIG. 25(b), the controller 180 may activate a first area of the touch screen 151 according to the detected second touch input and can output a predetermined lock screen 610 on the activated first area. The first area can include an area of the touch screen 151 on which the second touch input is detected. In particular, when the second touch input is detected, the first area may correspond to an area that extends from a point of the inactivated touch screen 151 touched by a user to a point on which the dragging in a left direction is terminated. Depending on the embodiment, the controller 180 may sequentially activate the first area from the point of the inactivated touch screen 151 touched by the user to the point on which the dragging in the left direction is terminated and may then be able to sequentially output a predetermined lock screen 610 from the point of the inactivated touch screen 151 touched by the user to the point on which the dragging in the right direction is terminated.

The controller 180 may detect a third touch input touching the touch screen 151 in the state that the first touch input is maintained. As an example, the third touch input may correspond to a touch input touching a point of the activated first area and dragging the touch input to a point of the inactivated second area of the touch screen 151. In particular, a user may touch the lock screen 610 outputted on the activated first area and may then be able to take a posture of pulling the lock screen in a left direction.

Referring to FIG. 25(*c*), the controller 180 can activate the touch screen 151 as much as an area including from the activated first area to the point of the inactivated second area. And, the controller 180 can output the lock screen 610 on the activated area. The lock screen 610 shown in FIG. 25(*c*) can include information greater than information included in the lock screen 610 shown in FIG. 25(*b*).

Figure 26:
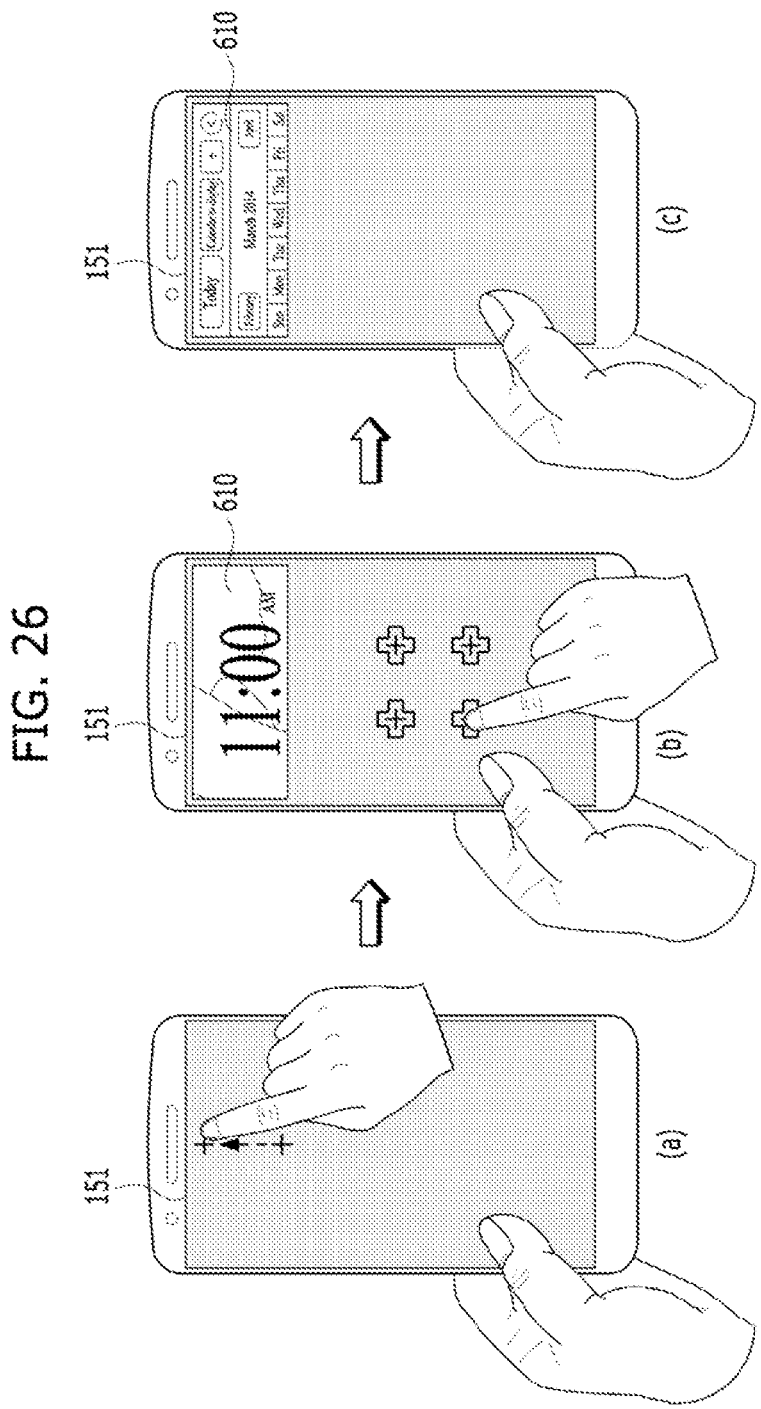
FIG. 26 is a diagram illustrating a further different example of a screen output on a display unit of a mobile terminal according to one embodiment of the present disclosure.

FIG. 26 is a diagram illustrating a further different example of a screen outputted on a display unit of a mobile terminal according to one embodiment of the present disclosure.

Referring to FIG. 26(*a*), a controller 180 of a mobile terminal 100 detects a first touch input touching a random point of an inactivated touch screen 151. Subsequently, the controller 180 detects a second touch input touching the inactivated touch screen 151 in a state in which the first touch input is maintained. As an example, the second touch input may correspond to a touch input touching a point of the inactivated touch screen 151 and dragging the touch input in an up direction.

Referring to FIG. 26(*b*), the controller 180 may activate a first area of the touch screen 151 according to the detected second touch input and may output a predetermined lock screen 610 on the activated first area. The first area can include an area of the touch screen 151 on which the second touch input is detected. In particular, when the second touch input is detected, the first area may correspond to an area that extends from a point of the inactivated touch screen 151 touched by a user to a point on which the dragging in the up direction is terminated.

The controller 180 may detect a third touch input touching an inactivated second area of the touch screen 151 in the state that the first touch input is maintained. As an example, the third touch input may correspond to a touch input touching a plurality of points of the second area in a predetermined order. And, the third touch input can be matched with a password used for unlocking a screen lock set to the touch screen 151.

Referring to FIG. 26(*c*), the controller 180 may unlock a screen lock set to the activated first area and may output a predetermined screen 620 on the activated first area. The predetermined screen 620 may correspond to a home screen or a screen which was outputted immediately before the touch screen 151 was previously inactivated. As an example, the predetermined screen 620 may correspond to an execution screen of a specific application which is executed immediately before the touch screen 151 was inactivated.

Figure 27:
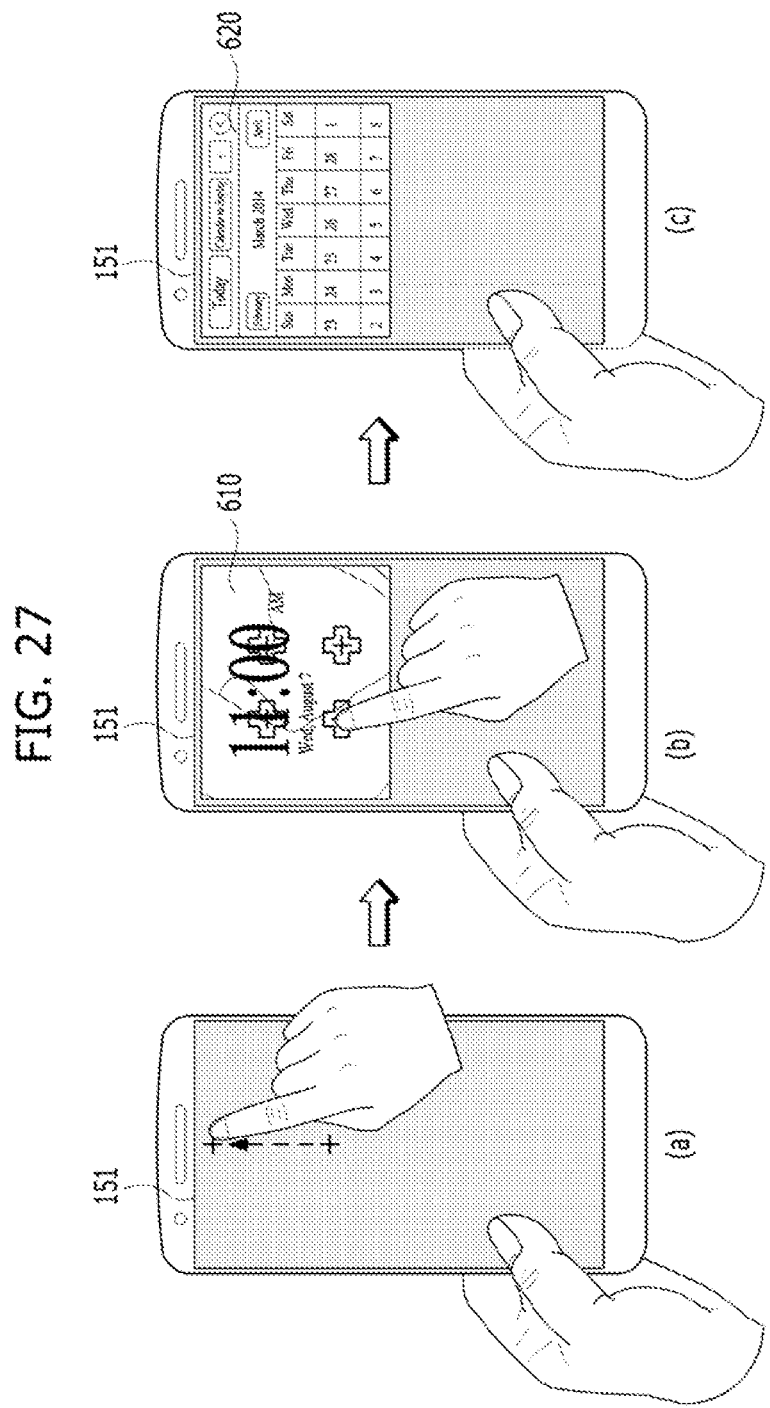
FIG. 27 is a diagram illustrating a further different example of a screen output on a display unit of a mobile terminal according to one embodiment of the present disclosure.

FIG. 27 is a diagram illustrating a further different example of a screen outputted on a display unit of a mobile terminal according to one embodiment of the present disclosure.

Referring to FIG. 27(*a*), a controller 180 of a mobile terminal 100 detects a first touch input touching a random point of an inactivated touch screen 151. Subsequently, the controller 180 detects a second touch input touching the inactivated touch screen 151 in a state in which the first touch input is maintained. As an example, the second touch input may correspond to a touch input touching a point of the inactivated touch screen 151 and dragging the touch input in an up direction.

Referring to FIG. 27(*b*), the controller 180 may activate a first area of the touch screen 151 according to the detected second touch input and can output a predetermined lock screen 610 on the activated first area. The first area can include an area of the touch screen 151 on which the second touch input is detected. In particular, when the second touch input is detected, the first area may correspond to an area that extends from a point of the inactivated touch screen 151 touched by a user to a point on which the dragging in the up direction is terminated.

The controller 180 may detect a third touch input touching the activated first area of the touch screen 151 in the state that the first touch input is maintained. As an example, the third touch input may correspond to a touch input touching a plurality of points of the first area in a predetermined order. And, the third touch input can be matched with a password used for unlocking a screen lock set to the touch screen 151.

Referring to FIG. 27(*c*), the controller 180 may unlock a screen lock set to the activated first area and may output a predetermined screen 620 on the activated first area. The predetermined screen 620 may correspond to a home screen or a screen which was outputted immediately before the touch screen 151 was previously inactivated. As an example, the predetermined screen 620 may correspond to an execution screen of a specific application which is executed Immediately before the touch screen 151 was inactivated.

Figure 28:
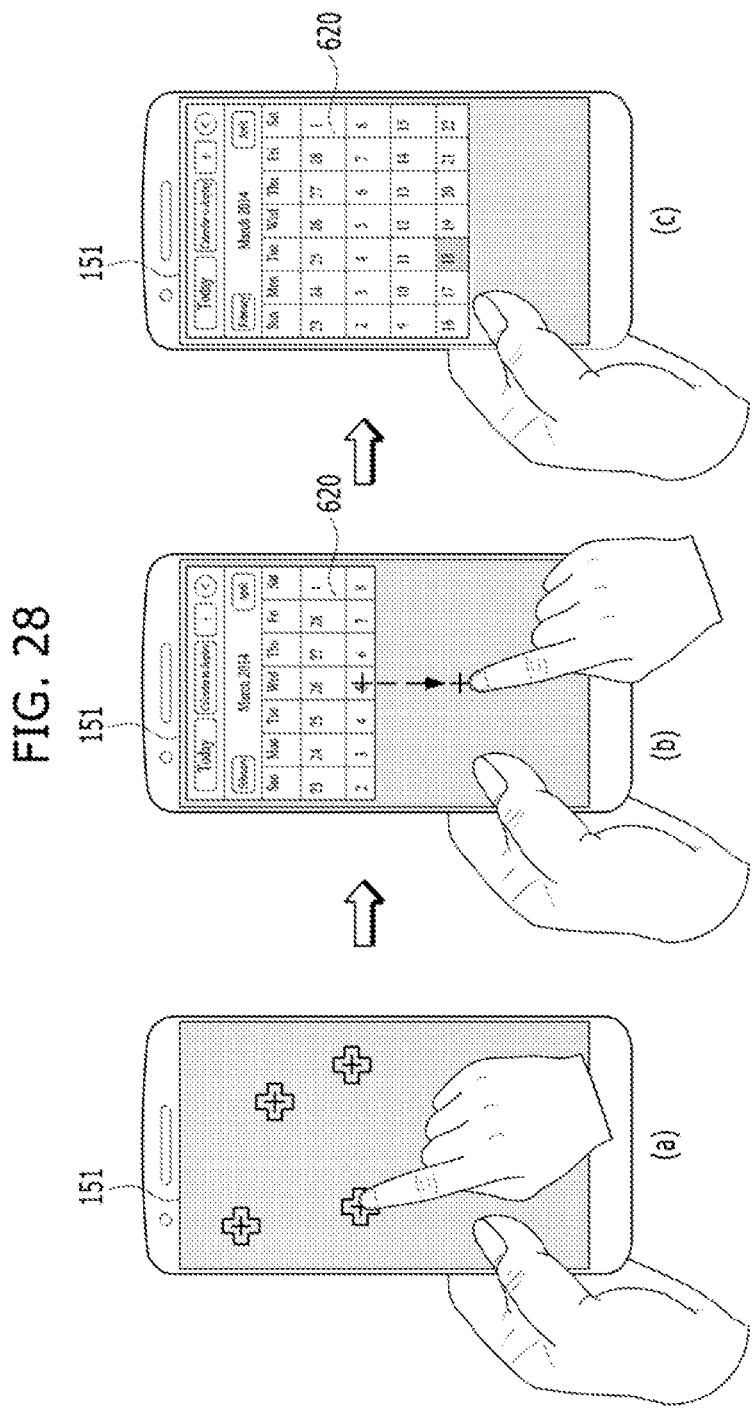
FIG. 28 is a diagram illustrating a further different example of a screen output on a display unit of a mobile terminal according to one embodiment of the present disclosure.

FIG. 28 is a diagram illustrating a further different example of a screen outputted on a display unit of a mobile terminal according to one embodiment of the present disclosure.

Referring to FIG. 28(*a*), a controller 180 of a mobile terminal 100 detects a first touch input touching a random point of an inactivated touch screen 151. Subsequently, the controller 180 detects a second touch input touching the inactivated touch screen 151 in a state in which the first touch input is maintained. As an example, the second touch input may correspond to a touch input touching a plurality of points of the inactivated touch screen 151 in a predetermined order. And, the second touch input can be matched with a password used for unlocking a screen lock set to the touch screen 151.

Referring to FIG. 28(*b*), the controller 180 may unlock a screen lock set to a first area of the touch screen 151 according to the detected second touch input and may activate the first area of the touch screen 151. The first area may correspond to an area including all of a plurality of the points of the touch screen 151 on which the second touch input is detected. Depending on the embodiment, the first area can include at least one or more of a plurality of the points as a most outer area or a vertex area. And, the controller 180 can output a predetermined screen 620 on the activated first area. The predetermined screen 620 may correspond to a home screen or a screen which was outputted immediately before the touch screen 151 was previously inactivated. As an example, the predetermined screen 620 may correspond to an execution screen of a specific application which was executed immediately before the touch screen 151 was inactivated.

The controller 180 may detect a third touch input touching the touch screen 151 in the state that the first touch input is maintained. As an example, the third touch input may correspond to a touch input touching a point of the activated first area and dragging the touch input to a point of the inactivated second area of the touch screen 151. In particular, a user may touch the screen 620 outputted on the activated first area and may then be able to take a posture of pulling the screen in a down direction.

Referring to FIG. 28(*c*), the controller 180 can activate the touch screen 151 as much as an area including from the activated first area to the point of the inactivated second area. And, the controller 180 can output the screen 620 on the activated area. The screen 620 shown in FIG. 28(*c*) can include information greater than information included in the screen 620 shown in FIG. 28(*b*).

FIG. 29 is a diagram illustrating a further different example of a screen outputted on a display unit of a mobile terminal according to one embodiment of the present disclosure. Contents overlapped with what is mentioned earlier in FIG. 28 are omitted at this time. Following description mainly concerns difference.

Referring to FIG. 29(*a*), a controller 180 of a mobile terminal 100 detects a first touch input touching a random point of an inactivated touch screen 151. Subsequently, the controller 180 detects a second touch input touching the inactivated touch screen 151 in a state in which the first touch input is maintained. As an example, the second touch input may correspond to a touch input touching a plurality of points of the inactivated touch screen 151 in a predetermined order. And, the second touch input can be matched with a password used for unlocking a screen lock set to the touch screen 151.

Since the second touch input corresponds to a touch input which may divide a prescribed area of the inactivated touch screen 151 into at least one or more virtual areas and touching the at least one or more divided virtual areas in a predetermined order, a user can randomly select the prescribed area in which the second touch input is to be inputted from the touch screen 151.

Referring to FIG. 29(*b*), the controller 180 may unlock a screen lock set to a first area of the touch screen 151 according to the detected second touch input and can activate the first area of the touch screen 151. The first area may correspond to an area including all of a plurality of the points of the touch screen 151 on which the second touch input is detected. Depending on the embodiment, the first area can include at least one or more of a plurality of the points as a most outer area or a vertex area.

According to the present embodiment, a user can randomly select the prescribed area in which the second touch input is to be inputted from the touch screen 151. Hence, a screen lock can be unlocked or activated only on a preferred area of the touch screen 151.

FIG. 30 is a diagram illustrating a further different example of a screen outputted on a display unit of a mobile terminal according to one embodiment of the present disclosure.

Referring to FIG. 30(*a*), a controller 180 of a mobile terminal 100 detects a first touch input touching a random point of an inactivated touch screen 151. Subsequently, the controller 180 detects a second touch input touching the inactivated touch screen 151 in a state in which the first touch input is maintained. As an example, the second touch input may correspond to a touch input touching a plurality of points of the inactivated touch screen 151 in a predetermined order. And, the second touch input can be matched with a password used for unlocking a screen lock set to the touch screen 151.

Referring to FIG. 30(*b*), the controller 180 can unlock the screen lock set to the touch screen 151 according to the detected second touch input.

Subsequently, the controller 180 may detect a predetermined user input. The predetermined user input may correspond to a touch input touching a point of the inactivated touch screen 151 or a user input hovering on the inactivated touch screen 151.

The controller 180 can activate a specific area of the touch screen 151 on which the predetermined user input is detected. Depending on the embodiment, a part of a home screen corresponding to the activated specific area or a part of a screen, which was outputted immediately before the touch screen was previously inactivated, corresponding to the activated specific area can be outputted.

Referring to FIG. 30(*c*), the controller 180 can detect movement of a specific point of the touch screen 151 on which the predetermined user input is detected. And, the controller 180 can change a position of an activated area of the touch screen 151 according to the movement of the specific point. In particular, the controller 180 inactivates a previously activated area and can activate an area including the specific point of the touch screen 151 on which the predetermined user input is detected.

According to at least one or more embodiments mentioned in the foregoing description, when a user intends to use a predetermined specific application or a specific function in a state in which a display unit is inactivated, the present disclosure can provide user environment enabling the user to more conveniently access the application or the function.

The present disclosure mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
   a touch screen; and
   a controller configured to control output on the touch screen based on touch inputs detected while the touch screen is in an inactive state,
   wherein a first touch input is detected at a point on the touch screen while the touch screen is inactive, a second touch input is detected on the inactive touch screen while the first touch input is maintained on the touch screen, an entire area or a partial area of the touch screen is activated according to the detected second touch input while the first touch input is maintained on the touch screen, an execution screen of a prescribed application is output on the activated area of the touch screen while the first touch input is maintained on the touch screen, and a third touch input is detected on the activated area of the touch screen or an inactive area of the touch screen in a state in which the first touch input is maintained on the touch screen and a specific function related to the prescribed application is executed according to the detected third touch input in the state in which the first touch input is maintained on the touch screen,
   wherein the prescribed application corresponds to a camera application and the execution screen includes a preview image captured by a camera of the mobile terminal, and
   wherein the controller is further configured to control the camera to capture an image when the third touch input is released while the first touch input is maintained.

2. The mobile terminal of claim 1, wherein the second touch input includes at least one of a touch input at a point on the inactive touch screen, a touch and drag input in which a touch applied at a point on the inactive touch screen is dragged in a random direction, a touch and flick input in which a touch applied at a point on the inactivated touch screen is flicked in a random direction, or a touch input that includes touches applied in turn at plurality of points on the inactive touch screen.

3. The mobile terminal of claim 1, wherein the specific function includes at least one of a focusing function, a picture capturing function, a picture preview function, a zoom-in function, a zoom-out function, or a front/rear camera switching function.

4. The mobile terminal of claim 1, wherein, when the third touch input is detected on a point on the activated area of the touch screen, the camera is controlled to focus on the point at which the third touch input is detected in the preview image while the first touch input is maintained.

5. The mobile terminal of claim 1, wherein, when the third touch input is detected on the inactive area of the touch screen, the camera is controlled to execute an autofocus function while the first touch input is maintained on the touch screen.

6. The mobile terminal of claim 1, wherein, when the third touch input is a touch and flick input in which a touch at a point of the activated area of the touch screen is flicked in a random direction, the controller is configured to output a most recently captured image on the activated area of the touch screen while the first touch input is maintained.

7. The mobile terminal of claim 1, wherein the camera includes a front camera and a rear camera, and wherein when the preview image is captured by the rear camera, the controller is configured to output a preview image captured by the front camera on the activated area of the touch screen according to the detected third touch input while the first touch input is maintained.

8. The mobile terminal of claim 1, wherein, when the execution screen of the prescribed application is outputted, a movement of the point of the first touch input on the touch screen is detected and at least one of a position or a size of the activated area of the touch screen is changed according to the movement of the first touch input while the first touch input is maintained on the touch screen.

9. The mobile terminal of claim 1, wherein, when release of the first touch input is detected, the controller is configured to make the touch screen inactive.

10. The mobile terminal of claim 1, further comprising an optical output module,
    wherein the prescribed application corresponds to a flashlight application and the controller is configured to control the optical output module to output light of prescribed brightness.

11. The mobile terminal of claim 10, wherein, when the execution screen of the prescribed application is outputted, a third touch input is detected while the first touch input is maintained on the touch screen, the third touch input being a touch and drag input in a prescribed direction, and the optical output module is controlled to control brightness of the outputted light according to the detected third touch input while the first touch input is maintained.

12. A method of controlling a mobile terminal, comprising:
    detecting a first touch input at a point on a touch screen which is in an inactive state;
    detecting a second touch input on the inactive touch screen while the first touch input is maintained on the touch screen;
    activating a first area of the touch screen according to the detected second touch input while the first touch input is maintained on the touch screen;
    detecting a third touch input on the activated first area or an inactivate area of the touch screen while the first touch input is maintained on the touch screen;
    executing a specific function related to a prescribed application corresponding to a camera application;
    outputting a prescribed first screen including a preview image captured by a camera of them mobile terminal on the activated first area while the first touch input is maintained on the touch screen; and
    capturing an image by the camera when the third touch input is released while the first touch input is maintained on the touch screen.

13. The method of claim 12,
    wherein the specific function includes at least one of a focusing function, a picture capturing function, a picture preview function, a zoom-in function, a zoom-out function, or a front/rear camera switching function.

14. The method of claim 12,
    further comprising:
    controlling the camera to focus on the point at which the third input is detected in the preview image while the first touch input is maintained.

15. The method of claim 12,
    further comprising:
    controlling the camera to execute an autofocus function while the first touch input is maintained.

16. The method of claim 12,
    further comprising:
    outputting a most recently captured image on the activated first area of the touch screen while the first touch input is maintained when the third touch input is a touch and flick input in which a touch at a point of the activated first area of the touchscreen is flicked in a random direction.

17. The method of claim 12, further comprising:
changing at least one of a position or a size of the activated first area according to the movement of the first touch input while the first touch input is maintained on the touch screen.

18. The method of claim 12, further comprising:
detecting release of the first touch input; and
controlling the touch screen to be inactive according to the release of the first touch input.

* * * * *